(12) United States Patent
Hackbarth, Jr. et al.

(10) Patent No.: US 7,809,127 B2
(45) Date of Patent: Oct. 5, 2010

(54) METHOD FOR DISCOVERING PROBLEM AGENT BEHAVIORS

(75) Inventors: Kenneth R. Hackbarth, Jr., Westminster, CO (US); Murray Jenson, Lakewood, CO (US); Joylee E. Kohler, Northglenn, CO (US); Henry R. Paddock, Boulder, CO (US); Katherine A. Sobus, Wilmington, DE (US); David Zanoni, Bethlehem, PA (US)

(73) Assignee: Avaya Inc., Basking Ridge, NJ (US)

( * ) Notice: Subject to any disclaimer, the term of this patent is extended or adjusted under 35 U.S.C. 154(b) by 1258 days.

(21) Appl. No.: 11/193,585

(22) Filed: Jul. 28, 2005

(65) Prior Publication Data

US 2006/0271418 A1    Nov. 30, 2006

Related U.S. Application Data

(60) Provisional application No. 60/685,258, filed on May 26, 2005.

(51) Int. Cl.
*H04M 3/00* (2006.01)
*H04M 5/00* (2006.01)

(52) U.S. Cl. .............................. 379/265.01; 379/265.02; 379/265.06; 379/266.01; 379/309; 705/7

(58) Field of Classification Search ............ 379/265.01, 379/265.02, 265.06, 266.01, 309; 705/7
See application file for complete search history.

(56) References Cited

U.S. PATENT DOCUMENTS

| | | | |
|---|---|---|---|
| 4,163,124 A | 7/1979 | Jolissaint | |
| 4,510,351 A | 4/1985 | Costello et al. | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,981 A | 11/1992 | Mitchell et al. | |
| 5,164,983 A | 11/1992 | Brown et al. | |

(Continued)

FOREIGN PATENT DOCUMENTS

CA    2143198    1/1995

(Continued)

OTHER PUBLICATIONS

Microsoft Office Animated Help Tool, date unknown, 1 page.

(Continued)

*Primary Examiner*—Quynh H Nguyen
(74) *Attorney, Agent, or Firm*—Sheridan Ross P.C.

(57) ABSTRACT

A contact center is provided that includes a plurality of agents for servicing incoming contacts and a target behavior identification module operable to (i) process a set of events to yield a corresponding measure; (ii) compare the measure to a plurality of rule sets, each of the rule sets corresponding to a different type of target behavior; and (iii) when the measure is defined by the a selected rule set, associate the measure with a type of target behavior corresponding to the selected rule set.

36 Claims, 11 Drawing Sheets

U.S. PATENT DOCUMENTS

| | | | |
|---|---|---|---|
| 5,167,010 A | 11/1992 | Elm et al. | |
| 5,185,780 A | 2/1993 | Leggett | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,289,368 A | 2/1994 | Jordan et al. | |
| 5,291,550 A | 3/1994 | Levy et al. | |
| 5,299,260 A | 3/1994 | Shaio | |
| 5,309,513 A | 5/1994 | Rose | |
| 5,311,422 A | 5/1994 | Loftin et al. | |
| 5,325,292 A * | 6/1994 | Crockett | 705/9 |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,467,391 A | 11/1995 | Donaghue, Jr. et al. | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,499,291 A * | 3/1996 | Kepley | 379/265.06 |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,555,299 A | 9/1996 | Maloney et al. | |
| 5,577,169 A | 11/1996 | Prezioso | |
| 5,592,378 A | 1/1997 | Cameron et al. | |
| 5,592,542 A | 1/1997 | Honda et al. | |
| 5,594,726 A | 1/1997 | Thompson et al. | |
| 5,603,029 A | 2/1997 | Aman et al. | |
| 5,604,892 A | 2/1997 | Nuttall et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,721,770 A * | 2/1998 | Kohler | 379/265.12 |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,742,763 A | 4/1998 | Jones | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,784,452 A | 7/1998 | Carney | |
| 5,790,642 A | 8/1998 | Taylor et al. | |
| 5,790,650 A | 8/1998 | Dunn et al. | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,802,510 A | 9/1998 | Jones | |
| 5,818,907 A | 10/1998 | Maloney et al. | |
| 5,819,084 A | 10/1998 | Shapiro et al. | |
| 5,825,869 A | 10/1998 | Brooks et al. | |
| 5,826,039 A | 10/1998 | Jones | |
| 5,828,747 A | 10/1998 | Fisher et al. | |
| 5,836,011 A | 11/1998 | Hambrick et al. | |
| 5,838,968 A | 11/1998 | Culbert | |
| 5,839,117 A | 11/1998 | Cameron et al. | |
| 5,864,874 A | 1/1999 | Shapiro | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A * | 5/1999 | Tonisson | 379/265.12 |
| 5,903,877 A | 5/1999 | Berkowitz et al. | |
| 5,905,793 A | 5/1999 | Flockhart et al. | |
| 5,909,669 A | 6/1999 | Havens | |
| 5,911,134 A | 6/1999 | Castonguay et al. | |
| 5,914,951 A | 6/1999 | Bentley et al. | |
| 5,915,012 A | 6/1999 | Miloslavsky | |
| 5,923,745 A | 7/1999 | Hurd | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandit | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,014,437 A | 1/2000 | Acker et al. | |
| 6,031,896 A | 2/2000 | Gardell et al. | |
| 6,038,293 A | 3/2000 | McNerney et al. | |
| 6,038,296 A | 3/2000 | Brunson et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,049,779 A | 4/2000 | Berkson | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,084,954 A | 7/2000 | Harless et al. | |
| 6,088,441 A | 7/2000 | Flockhart et al. | |
| 6,108,670 A | 8/2000 | Weida et al. | |
| 6,115,462 A | 9/2000 | Servi et al. | |
| 6,128,304 A | 10/2000 | Gardell et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,185,603 B1 | 2/2001 | Henderson et al. | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick et al. | |

| | | |
|---|---|---|
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,459,787 B2 | 10/2002 | McIllwaine et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 * | 9/2003 | Flockhart et al. ....... 379/265.12 |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,340,408 B1 | 3/2008 | Drew et al. |
| 7,376,127 B2 | 5/2008 | Hepworth et al. |
| 7,392,402 B2 | 6/2008 | Suzuki |
| 7,418,093 B2 | 8/2008 | Knott et al. |
| 7,499,844 B2 | 3/2009 | Whitman, Jr. |
| 7,545,925 B2 | 6/2009 | Williams |
| 2001/0011228 A1 | 8/2001 | Shenkman |
| 2001/0034628 A1 | 10/2001 | Eder |
| 2001/0056349 A1 | 12/2001 | St. John |
| 2001/0056367 A1 * | 12/2001 | Herbert et al. ................ 705/11 |
| 2002/0002460 A1 | 1/2002 | Pertrushin |
| 2002/0002464 A1 | 1/2002 | Petrushin |
| 2002/0010587 A1 | 1/2002 | Pertrushin |
| 2002/0012186 A1 | 1/2002 | Nakamura et al. |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0118816 A1 | 8/2002 | Flockhart et al. |
| 2002/0123923 A1 | 9/2002 | Manganaris et al. |

| | | |
|---|---|---|
| 2002/0181692 A1 | 12/2002 | Flockhart et al. |
| 2002/0194002 A1 | 12/2002 | Petrushin |
| 2003/0014491 A1 | 1/2003 | Horvitz et al. |
| 2003/0028621 A1 | 2/2003 | Furlong et al. |
| 2003/0048893 A1 | 3/2003 | McIllwaine et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0174830 A1 | 9/2003 | Boyer et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0165717 A1 | 8/2004 | McIlwaine et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1* | 12/2004 | Freedman et al. ............... 705/1 |
| 2004/0260706 A1 | 12/2004 | Anonsen et al. |
| 2005/0021529 A1 | 1/2005 | Hodson et al. |
| 2005/0027612 A1 | 2/2005 | Walker et al. |
| 2005/0044375 A1 | 2/2005 | Paatero et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |

FOREIGN PATENT DOCUMENTS

| | | |
|---|---|---|
| CA | 2174762 | 3/1996 |
| EP | 0501189 | 9/1992 |
| EP | 0 740 450 A2 | 10/1996 |
| EP | 0770967 | 5/1997 |
| EP | 0772335 | 5/1997 |
| EP | 0 829 996 A2 | 3/1998 |
| EP | 0 855 826 A2 | 7/1998 |
| EP | 0 866 407 A1 | 9/1998 |
| EP | 0863651 | 9/1998 |
| EP | 899673 | 3/1999 |
| EP | 988108 | 5/2000 |
| EP | 1035718 | 9/2000 |
| EP | 1091307 | 4/2001 |
| EP | 1150236 | 10/2001 |
| GB | 2273418 | 6/1994 |
| GB | 2290192 | 12/1995 |
| JP | 2001-053843 | 2/2001 |
| JP | WO 02/099640 | 12/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |

OTHER PUBLICATIONS

Karakasidis A. "Queues for Active Data Warehousing", Jun. 17, 2005, Baltimore, MA, in Proceedings on Information Quality in Informational Systems (IQIS'2005), S.28-39, ISBN: 159593-160-0, DOI: 10.1109/DANTE.1999.844938.

Sarda, "Temporal Issues in Data Warehouse Systems", 1999, Database Applications in Non-Traditional Environments (DANTE'99), S. 27, DOI: 10.1109/DANTE.1999.844938.

U.S. Appl. No. 12/242,916, filed Oct. 1, 2008, Kiefhaber et al.

Dillion, "Renaming fields and tracing dependencies", available at http://allenbrowne.com/ser-41.html, Nov. 2003, updated May 2006, 1 page.

Thayer Watkins, "Cost Benefit Analysis", 1999, San Jose State University Economics Department, Web Archive http://web.arch ive.org/web/19990225143131 /http://www.sjsu.edu/faculty/watkins/cba.htm.

U.S. Appl. No. 12/193,542, filed Aug. 18, 2008, Olson.

"Learn the structure of an Access database", available at http://office.microsoft.com/en-us/access/HA012139541033.aspx, site updated Nov. 13, 2007, pp. 1-4.

Search Report and Opinion for European Patent Application No. 06251745.3, mailed Apr. 24, 2009.

U.S. Appl. No. 11/242,687, filed Oct. 3, 2005, Krimstock et al.

Bischoff et al. "Data Ware House Building Method—practical advices telled by persons having experience and experts", Kyouritsu Shuppan Corp. May 30, 2000, first edition, pp. 197-216.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Koutarou, "Building a Framework for EC using Hibernate, OSWorkflow", JAVA Press, Japan, Gujutsu Hyouron Company, vol. 25, 2004, pp. 132-147.

Microsoft R Access 97 for Windows R Application development guide, Ver. 8.0, Microsoft Corp., a first version, pp. 569-599.

Communication from the Examining Division for European Patent Application No. 06251745.3, mailed Nov. 3, 2009, 1 page.

U.S. Appl. No. 11/517,646, Hackbarth.

U.S. Appl. No. 11/536,456, Hackbarth.

U.S. Appl. No. 10/815,566, Kiefhaber.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Avaya, Inc Business Advocate Options, at http://www.avaya.com, downloaded on Feb. 15, 2003, Avaya, Inc 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality In IP Voice Networks," Avaya, Inc., 2002, pp. 1-17.
Dawson, "NPRI's Powerguide, Software Overivew" Call Center Magazine (Jun. 1993), p. 85.
DEFINITY Communications System Generic 3 Call Vectoring/Expert Agent Selection (EAS) Guide, AT&T publication No. 555-230-520 (Issue 3, Nov. 1993).
Foster, Robin, et al., "Avaya Buisness Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources., 1998, 6 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
"Call Center Recording for Call Center Quality Assurance" Voice Print Interantional, Inc., available at http://www.voiceprintonline.com/call-center-recording.asp?ad_src=google&srch_trm=call_center_monitoring, date unknown, printed May 10, 2007, 2 pages.
"KANA—Contact Center Support", available at http://www.kana.com/solutions.php=tid?46, copyright 2006, 3 pages.
"Monitoring: OneSight Call Statistics Monitors", available at http://www.empirix.com/defautl.asp?action=article&ID=301, date unknown, prited May 10, 2007, 2 pages.
"Oracle and Siebel" Oracel, available at http://www.oracle.com/siebel/index.html, date unknown, printed May 10, 2007, 2 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Service," available at http://www.pism.com/chapt09/chapt09.html, downloaded Mar. 31, 2003, 21 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120 p. 59, 1992.
"Product Features," Guide to Call Center Automation, CRC Information Systems, Inc., Tel-ATHENA, Section 5—Company C520, p. 95, 1992.
"VAST™ Voicelink Application Software for Teleservicing®," System Manager User's Guide, Digital Systems (1994), pp. ii, vii-ix, 1-2, 2-41 through 2-77.
U.S. Appl. No. 10/683,039, filed Oct. 10, 2003, Flockhart et al.
U.S. Appl. No. 10/861,193, filed Jun. 3, 2004, Kiefhaber.
U.S. Appl. No. 10/946,638, filed Sep. 20, 2004, Flockhart et al.
U.S. Appl. No. 11/087,290, filed Mar. 22, 2005, Michaelis.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/861,857, filed Sep. 26, 2007, Tendick et al.
"Still Leaving It To Fate?: Optimizing Workforce Management" Durr, William Jr., Nov. 2001.
G. Hellstrom et al., "RFC 2793—RTP Payload for Text Consersation," Network Working Group Request for Comments 2793 (May 2000), available at http://www.faqs.org/rfcs/rfc2793.html, 8 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
"Services for Computer Supported Telecommunications Applications (CSTA) Phase III"; Standard ECMA-269, 5th Edition—Dec. 2002; ECMA International Standardizing Information and communication Systems; URL: http://www.ecma.ch; pp. 1-666 (Parts 1-8).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
Kimball, et al., "Practical Techniques for Extracting, Cleaning, Conforming, and Delivering Data." The Data Warehouse ETL Toolkit. 2004. Ch. 5, pp. 170-174.
Snape, James, "Time Dimesion and Time Zones." 2004. pp. 1-10. http://www.jamessnape.me.uk/blog/CommentView,gui,79e910a1-0150-4452-bda3-e98d.
Data Warehouse Designer—Divide and Conquer, Build Your Data Warehouse One Piece at a Time, Ralph Kimball, Oct. 30, 2002, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Creating and Using Data Warehouse Dimension Tables (Microsoft) copyright 2005, http://msdn.microsoft.com/library/en-us/createdw/createdw_10kz.asp?frame=true, 3 pages.
DMReview—Business Dimensional Modeling: The Logical Next Step: Translating the BDM, Laura Reeves, published May 2004, 4 pages.
Multi-Dimensional Modeling with BW ASAP for BW Accelerator Business Information Warehouse, copyright 2000, 71 pages.
ComputerWorld, ETL, M. Songini, at http://www.computerworld.com/databasetopics/businessintelligence/datawarehouse/story/....., copyright 2005, 5 pages.
Kimball et al., "The Complete Guide to Dimensional Modeling." The Data Warehouse Toolkit. 2nd Edition, 2002. ch. 11, pp. 240-241.
Fundamentals of Data Warehousing—Unit 3—Dimensional Modeling, Fundamentals of Data Warehousing, copyright 2005—Evolve Computer Solutions, 55 pages.
The Importance of Data Modeling as a Foundation for Business Insight, Larissa Moss and Steve Hoberman, copyright 2004, 38 pages.
CS 345: Topics in Data Warehousing, Oct. 5, 2004, 36 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 page.
Data Warehouse Designer Fact Tables and Dimension, Jan. 1, 2003, http://www.inteeigententerprise.com/030101/602warehouse1_1.jhtml, Ralph Kimball, 3 page.
Glossary—Curlingstone Publishing, http://www.curlingstone.com/7002/7002glossary.html, downloaded May 24, 2005, 11 pages.
Data Warehouse—Surrogate Keys, Keep Control Over Record Identifiers by Generating New Keys for the Data Warehouse, Ralph Kimball, May 1998, 4 pages.
Data Warehouse Designer—An Engineer's View—It's Worthwhile to Remind Ourselves Why We Build Data Warehouses the Way We Do, Ralph Kimball, Jul. 26, 2002, 3 pages.
Data Warehouse Designer—Design Constraints and Unavoidable Realities, No design Problem in School was This Hard, Ralph Kimball, Sep. 3, 2002, 3 pages.
Data Warehouse Designer—Two Powerful Ideas, The Foundation for Modern Data Warehousing, Ralph Kimball, Sep. 17, 2002, 3 pages.
A.A. Vaisman et al., "A Temporal Query Language for OLAP: Implementation and a Case Study" LNCS, 2001, vol. 2397, 36 pages.
A.B. Schwarzkopf, "Dimensional Modeling for a Data Warehouse", date unknown, 18 pages, Jul. 28, 2005.

Atkins et a.l; "Common Presence and Instant Messaging: Message Format," Network Working Group (Jan. 9, 2003), available at http://www.ietf.org/internet-draft/draft-ietf-impp-cpim-msgfmt-08.txt, 31 pages.
Bill Michael, "The Politics of Naming" www.cConvergence.com (Jul. 2001) pp. 31-35.
Crocker et al.; "Common Presence and Instant Messaging (CPIM)," Network Working Group (Aug. 14, 2002), available at http://www.ietf.org/internet-drafts/draft-ierf-impp-cpim-03.txt, 33 pages.
Day et al.; "A Model for Presence and Istant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
E. Veerman, "Designing A Dimensional Model", date unknown, 38 pages, Jul. 28, 2005.
G. Wiederhold, "Mediation to Deal with Heterogeneous Data Sources," Stanford University, Jan. 1999, 19 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
J. Cahoon "Fast Development of a Data Warehouse Using MOF, CWM and Code Generation", CubeModel, May 22, 2006, 32 pages.
J.E. Bentley, "Metadata: Everyone Talks About It, But What Is It?", First Union National Bank, date unknown, 5 pages, Jul. 28, 2005.
L. Cabibbo et al., "An Architecture For Data Warehousing Supporting Data Independence and Interoperability", International Journal of Cooperative Information Systems, Nov. 2004, 41 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sugano et al.; "Common Presence and Instant Messaging (CPIM) Presence Information Data Format," Network Working Group (Dec. 2002), available at http://www.ietf.org/internet-draft-ietf-impp-cpim-pidf-07.txt, 26 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
Andy Zmolek; "SIMPLE and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ieft.org/rfc/rfc2703.txt=number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Background of the Invention for the above-captioned application (previously provided), (Sep. 21, 2005).
U.S. Appl. No. 10/815,556, filed Mar. 31, 2004, Kiefhaber.
U.S. Appl. No. 10/815,534, filed Mar. 31, 2004, Kiefhaber.
U.S. Appl. No. 10/099,144, filed Mar. 15, 2002, Boyer et al.
U.S. Appl. No. 10/089,824, filed Mar. 15, 2002, Boyer et al.
U.S. Appl. No. 10/815,584, filed Mar. 31, 2004, Kiefhaber.
U.S. Appl. No. 10/174,278, filed Jun. 17, 2002, Harkreader et al.
U.S. Appl. No. 09/416,737, filed Oct. 13, 1999, Acui, et al.
NICE Systems—"Multimedia Interaction Products," "Insight from Interactions," http://www.nice.com/products/multimedia/contact_centers.php (Printed May 19, 2005) (3 pages).
NICE Systems—"Insight from Interactions," "Overwhelmed by the Amount of Data at your Contact Center?" http://www.nice.com/products/multimedia/analyzer.php, (Printed May 19, 2005) (2 pages).
Aspect—"Performance Optimization," http://aspect.com/products/wfm/performanceopt.cfm?section=perfomanceopt, (Copyright 2005) (1 page).
Nortel—"Centrex Internet Enabled Call Centers," http://www.products.nortel.ocm/go/product_assoc.jsp?segld=0&parID=0&catID=-9191&rend_id... (Copyright 1999-2005) (1 page).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Cherry, "Anger Management," IEEE Spectrum (Apr. 2005) (1 page).
Presentation by Victor Zue, The MIT Oxygen Project, MIT Laboratory for Computer Science (Apr. 25-26, 2000) (9 pages).
MIT Project Oxygen, Pervasive, Human-Centered Computing (MIT Laboratory for Computer Science) (Jun. 2000) (18 pages).
L.F. Lamel and J.L. Gauvain, *Language Identification Using Phone-Based Acoustic Likelihoods,* ICASSP-94 (4 pages).
John H.L., Hansen and Levent M. Arslan, *Foreign Accent Classification Using Source Generator Based Prosodic Features,* Robust Speech Processing Laboratory, Duke University Department of Electrical Engineering, Durham, NC (4 pages).
Levent M. Arslan and John H.L. Hansen, *Language Accent Classification in American English,* Robust Speech Processing Laboratory, Duke University Department of Electrical Engineering, Durham, NC Technical Report RSPL-96-7, revised jan. 29, 1996 (32 pages).
Levent M. Arslan, *Foreign Accent Classification in American English,* Department of Electrical Computer Engineering, Duke University, Dissertation (Copyright 1996) (217 pages).
Doo-Hyun Kim et al., "Collaborative Multimedia Middleware Architecture and Advanced Internet Call Center," Proceedings International Conference on Information Networking (Jan. 31, 2001), pp. 246-250 (3 pages).
E. Noth et al., "Research Issues for the Next Generation Spoken," University of Erlangen-Nuremberg, Bavarian Research Center for Knowledge-Based Systems, at http://www5.informatick.uni-erlangen.de/literature/psdir/1999/Noeth99.RIF.ps.gz. (8 pages).
No Author, "When Talk Isn't Cheap," Sm@rt Reseller, v. 3, n. 13 (Apr. 3, 2000), p. 50 (1 page).
No Author, "eGain's Commerce 2000 Platform Sets New Standard for eCommerce Customer Communications," Business Wire (Nov. 15, 1999) (3 pages).
Aspect—"Call Center Reports," http://aspect.com/products/analysis/ccreporting.cfm, (Copyright 2005) (2 pages).

Aspect—"Analysis and Reporting," http://aspect.com/products/analysis/index.cfm, (Copyright 2005) (1page).

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Multi Channel Product Authorization," (PA) Version 5.0, (Nov. 2003) (6 pages).

Avaya—"Avaya Call Management System" (Copyright 2003) (3 pages).

Avaya—"Avaya Basic Call Management System Reporting Desktop" (Copyright 2002) (4 pages).

Bischoff et al. "Data Ware House Building Method—practical advices telled by persons having experience and experts", Kyouritsu Shuppan Corp. May 30, 2000, first edition, pp. 197-216.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Koutarou, "Building a Framework for EC using Hibernate, OSWorkflow", JAVA Press, Japan, Gujutsu Hyouron Company, vol. 25, 2004, pp. 132-147.

Microsoft R Access 97 for Windows R Application development guide, ver.8.0, Microsoft Corp., a first version, pp. 569-599.

US 6,537,685, 03/2003, Higuchi (withdrawn)

* cited by examiner

METHOD FOR DISCOVERING PROBLEM AGENT BEHAVIORS

CROSS REFERENCE TO RELATED APPLICATION

This application claims the benefits under 35 U.S.C. §119 of U.S. Provisional patent application Ser. No. 60/685,258, filed May 26, 2005, of the same title and to the same inventors, which is incorporated herein by this reference.

Cross reference is made to U.S. patent application Ser. No. 10/815,556, filed Mar. 31, 2004, entitled "USING AGENT PATTERNS FOR PREDICTIVE AGENT ASSIGNMENTS", and Ser. No. 10/861,193, filed Jun. 3, 2004, entitled "DATA MODEL OF PARTICIPATION IN MULTI-CHANNEL AND MULTI-PARTY CONTACTS", each of which is incorporated herein by this reference.

FIELD

The present invention is directed generally to contact center administration and specifically to monitoring agent performance.

BACKGROUND

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

The primary objective of contact center management, including call-distribution algorithms, is to ultimately maximize contact center performance and profitability. An ongoing challenge in contact center administration is monitoring of agent behaviors to optimize the use of contact center resources and maximize agent performance and profitably. Agents can take many actions to "beat the system" or skew contact center statistics to "hide" deviant agent performance. Such problem agents are distinguished from poorly performing agents because they try to take advantage of the system to benefit themselves. Problem agents may behave in such a way that their metrics indicate that they are high performing agents when in fact they are not. For instance, an agent can have a long contact during which he or she is chit-chatting and follow that contact with a short contact during which the agent fails properly to service the customer so that the average duration of the two contacts falls within contact center targets. Because deviant behaviors are often varied and infrequent, they are hard to detect and correct. It is even more difficult to understand the reason for the behavior. For example, is the agent dumping a call so he or she can go to break on time?

Current products for monitoring and reporting on contact center performance are generally unable to isolate problem behaviors and identify contextual patterns. Current contact center reporting products monitor and report on the performance of agents. Generally, these are summary statistics, such as how many contacts were handled, average handle time, and result codes. Call Management System or CMS™ by Avaya, Inc., reports on a few problem behaviors in isolation. These behaviors include transfers, redirects from time out, disconnects from hold, long hold, aux time, direct time, conferences, contacts of less than a determined time or "short contacts", contacts of greater than a determined time or "long contacts", long alerts, and long wrap-ups. Nice Analyzer™ allows one to do ad-hoc queries to search for events, such as abandons from hold. The products fail to provide a systematic method for discovering beneficial or problem behaviors, reporting on combinations of problems, facilitating an understanding of what might be happening around the behavior that is contributing to it, and allowing the administrator to identify the behavior by type of contact being handled, e.g., inbound vs. outbound, direct vs. ACD delivered, and internal vs. external.

SUMMARY

These and other needs are addressed by the various embodiments and configurations of the present invention. The present invention is directed generally to the identification, analysis, and/or tracking of target behavior in a contact center.

In one embodiment, a method is provided that includes the steps of:

(a) processing a set of events to yield a corresponding measure;

(b) comparing the measure to a number of rule sets, each of the rule sets corresponding to a different type of target behavior; and (c) when the measure matches the selected rule set, associating the measure with a type of target behavior corresponding to the selected rule set. As used herein, a "measure" refers to a set of events having a defined relationship.

In another embodiment, the set of events includes a number of causally related events occurring at different times, and each rule set describes filters relative to a number of dimensions.

Using real-time, historic and/or detailed reports, the method can identify and focus on positive and negative (or problem) agent behaviors. The measures being tracked are commonly not focused on overall performance but rather to specific occurrences of identified problem behaviors. For example, target behaviors include long contact, short contact, long alert, long initiate, long preview, long wrap up, short wrap up, transfer from, transfer in, blind transfer, transfer to a same routing point and/or queue, conference, redirect due to agent rejection, redirect due to time out, cancel due to agent rejection, cancel due to time out, agent release first, disconnect from hold, long hold, hold time, short aux, aux time, aux working time, aux non-working time, wrap up time, direct time, internal time, variation in active time, and variation in wrap up time. As will be appreciated, a "contact" can be a communication over any medium, such as voice, email, chat, fax, etc., and "aux" or auxiliary refers to work items that are not directly related to servicing contacts.

Combinations of events that collectively identify a target behavior can be identified and monitored. Examples include short contact-then-aux, short contact-then-logout, login-then-aux, repeated conference or transfer to the same person, and short and long contacts side-by-side.

The behaviors may be either contact-related or time-based. In either case, problem behavior is typically identified by a number or duration of instances of the behavior exceeding a predetermined or business determined threshold.

The present invention can provide the ability to identify target behaviors impacting the business, and allow managers to stop or reward the behavior. In particular, the invention can provide a systematic method for discovering problem behaviors, reporting on combinations of problems, facilitating an understanding of what might be happening around the behavior that is contributing to it, and allowing the administrator to identify the behavior by type of contact being handled, e.g., inbound vs. outbound, direct vs. ACD delivered, and internal vs. external. The benefits of identifying problem behaviors can be substantial. Problem behaviors can cause the loss of customers, represent the misuse of company resources by agents performing unauthorized activities or actions, and lower moral of those engaging in or observing the behaviors. Moreover, problem behaviors are often an early warning sign of dissatisfaction and agent turnover.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
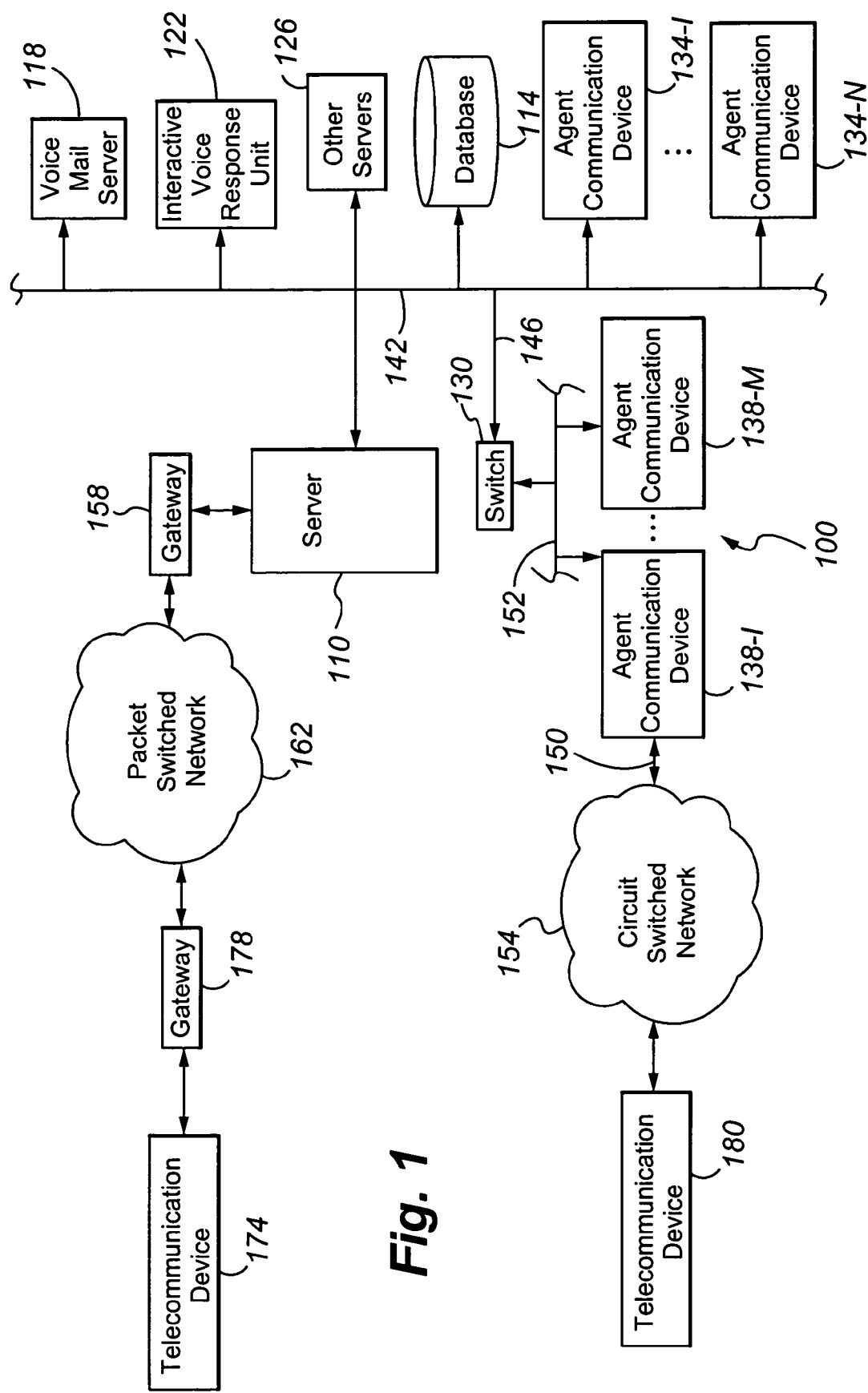
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Communication Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
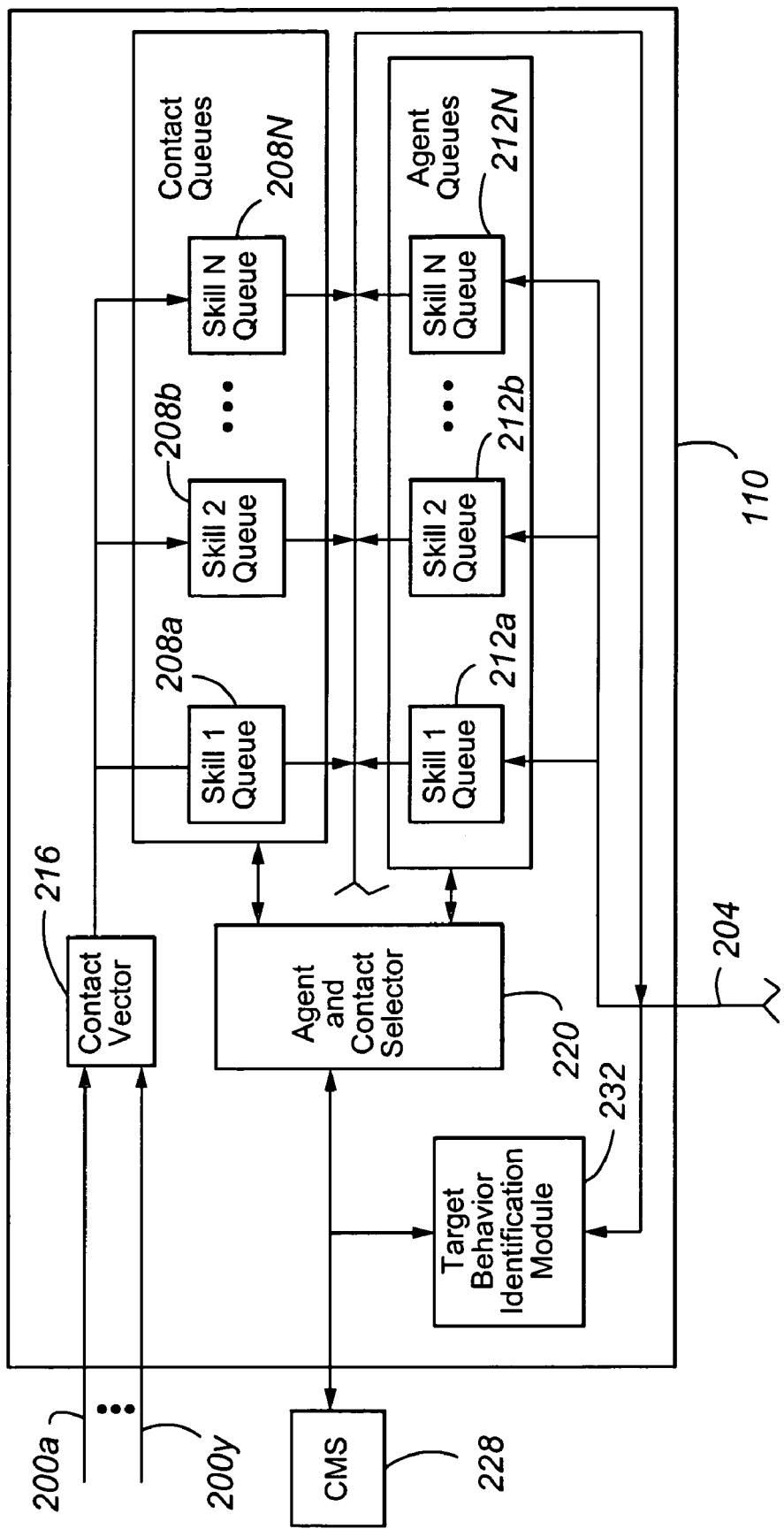
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System™ or BCMS 224 and a Call Management System™ or CMS 228 that gathers call records and contact-center statistics for use in generating contact-center reports. CMS and BCMS and any other reporting system, such as Operational Analyst™ will hereinafter be referred to jointly as CMS 228.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g.; switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

According to the invention, a target behavior identification module 232 is provided. The agent 232 is stored either in the main memory or in a peripheral memory (e.g., disk, CD ROM, etc.) or some other computer-readable medium of the center 100. The module 232 identifies and analyzes specific occurrences of identified target behaviors. The target behaviors may be behaviors that are considered by administration to be either beneficial or detrimental to contact center efficiency and profitability.

In one configuration, problem behaviors are tracked, identified, and/or analyzed by the module 232, by contact type and/or distribution method. Exemplary problem behaviors include the following:

1. long contacts or contacts in which the selected agent's active time spent communicating is greater than a specified time threshold;
2. short contacts or contacts in which the selected agent's active time spent communicating is less than a specified time threshold;
3. long alert or contacts in which the selected agent's alerting time was more than a specified time threshold;
4. long initiate or contacts in which the selected agent's time to dial the customer or otherwise initiating the contact was more than a specified time threshold;
5. long preview or contacts in which the selected agent's time to preview the work item or contact was more than a specified time threshold;
6. long wrap ups or contacts in which the selected agent's time to wrap up the contact was more than a specified time threshold;
7. short wrap ups or contacts in which the selected agent's time to wrap up the contact was less than a specified time threshold;
8. transfers from or contacts that were successfully transferred from the selected agent;
9. transfers in or contacts (such as from friends or acquaintances) that were successfully transferred to the selected agent;
10. blind transfers or contacts that were transferred to the selected agent prior to the far end or transferee accepting the transfer;
11. transfers to the same routing point or queue or contacts that were transferred by the selected agent back to the same routing point or queue that delivered the contact (e.g., with the hope of another selected agent being selecting to service the contact);
12. conferences or contacts to which the selected agent was a party and that had three or more simultaneous parties active at some point during the contact;
13. redirects or inbound contacts that were rejected by the selected agent after alerting started;
14. redirects due to time out or inbound contacts that were alerting to the selected agent and were redirected because they were not accepted within a time out period;
15. cancels or outbound contacts that were rejected by the selected agent before the far end accepted or answered the contact;
16. cancels due to time out or outbound contacts that were dropped because the far end did not accept the contact within the time out period;
17. agent releases first or contacts dropped by the selected agent with the customer being the last active party;
18. disconnects from hold or contacts put on hold by the selected agent that dropped prior to the selected agent reconnecting;
19. long holds or contacts that stayed on hold longer than a specified time threshold;
20. hold time or the sum of time intervals that contacts were put on hold by the selected agent;
21. short aux occurs when the selected agent stays in the aux (or auxiliary) state shorter than a specified time threshold;
22. aux time or the sum of all time intervals that the selected agent was in the aux state;
23. aux working time or the sum of all time intervals an selected agent was in aux states that are designated as working;
24. aux non-working time or the sum of all time intervals that the selected agent was in aux states that are designated as nonworking;
25. wrap up time or the sum of all time intervals that the selected agent was in the wrap-up state;
26. direct time or the sum of all time intervals that the selected agent was active on a contact distributed directly to the selected agent (i.e., not queued);
27. internal time or the sum of all time intervals in which the selected agent was active on a contact where all parties are internal to the system (i.e., have an interval address);
28. short contact-then-aux occurs when the selected agent has a contact whose active time slot and/or wrap-up time is less than a specified time threshold and the agent's next state is unstaffed (e.g., dumps a contact prior to break);
29. short contact-then-logout occurs when the selected agent has a contact whose active time and/or wrap-up time is less than a specified time threshold and the agent's next state is unstaffed (e.g., dumps a contact prior to break leaving);
30. login-then-aux occurs when the selected agent first logs in and immediately goes to the aux state (e.g., logs in but not ready to work);
31. short and long contacts side-by-side occurs when the agent manipulates contact durations to maintain a desired average serviced contact duration;
32. variation in active time occurs when across multiple contacts the selected agent has too little (less than a determined time threshold) or too much (in excess of a determined time threshold) variation in active time; and
33. variation in wrap-up time occurs when across multiple contacts the selected agent has too little (less than a determined time threshold) or too much (in excess of a determined time threshold) variation in wrap-up time.
34. Use of specific phrases in interacting with a customer (determined through content analysis or service observing).

In another configuration, beneficial behaviors are tracked, identified, and/or analyzed by the module 232, by contact type and/or distribution method. Exemplary beneficial behaviors include contacts, one-and-done, alerts, initiates, previews, wrap-ups, hold times having a duration within a specified time range (e.g., having a duration greater than a first selected threshold and less than a second selected threshold), and less than a selected threshold number of problem behaviors.

As will be appreciated, what is a problem behavior and what is a beneficial behavior frequently depends on the application. In different applications, the same behavior may be viewed in differing ways. Moreover, it is to be appreciated that the above lists of behaviors is not exhaustive. Other behaviors will be identified by those of ordinary skill in the art that are either problematic or beneficial.

The module 232 notifies contact center managers, in real time or periodically and using agent state and/or performance or problem behavior specific reports, when a selected agent has exhibited one or more of the target behaviors over a selected time period, such as one day or shift. Based on that notification, the module permits managers to drill down to a historical summary report to determine if a single target behavior or combination of target behaviors needs to be addressed or otherwise brought to the agent's attention. The same report can be used to review over a date range, such as a month, the total number of occurrences for or instances of each target behavior. From there, the manager can drill down and view data for each occurrence of a target behavior or can further refine the view by selecting only inbound or outbound contacts, direct or ACD distributed contacts, and/or interval or external contacts. Finally, the manager can further drill down to view a detailed trace for the agent or customer experience around the time the problem behavior occurred.

Figure 3:
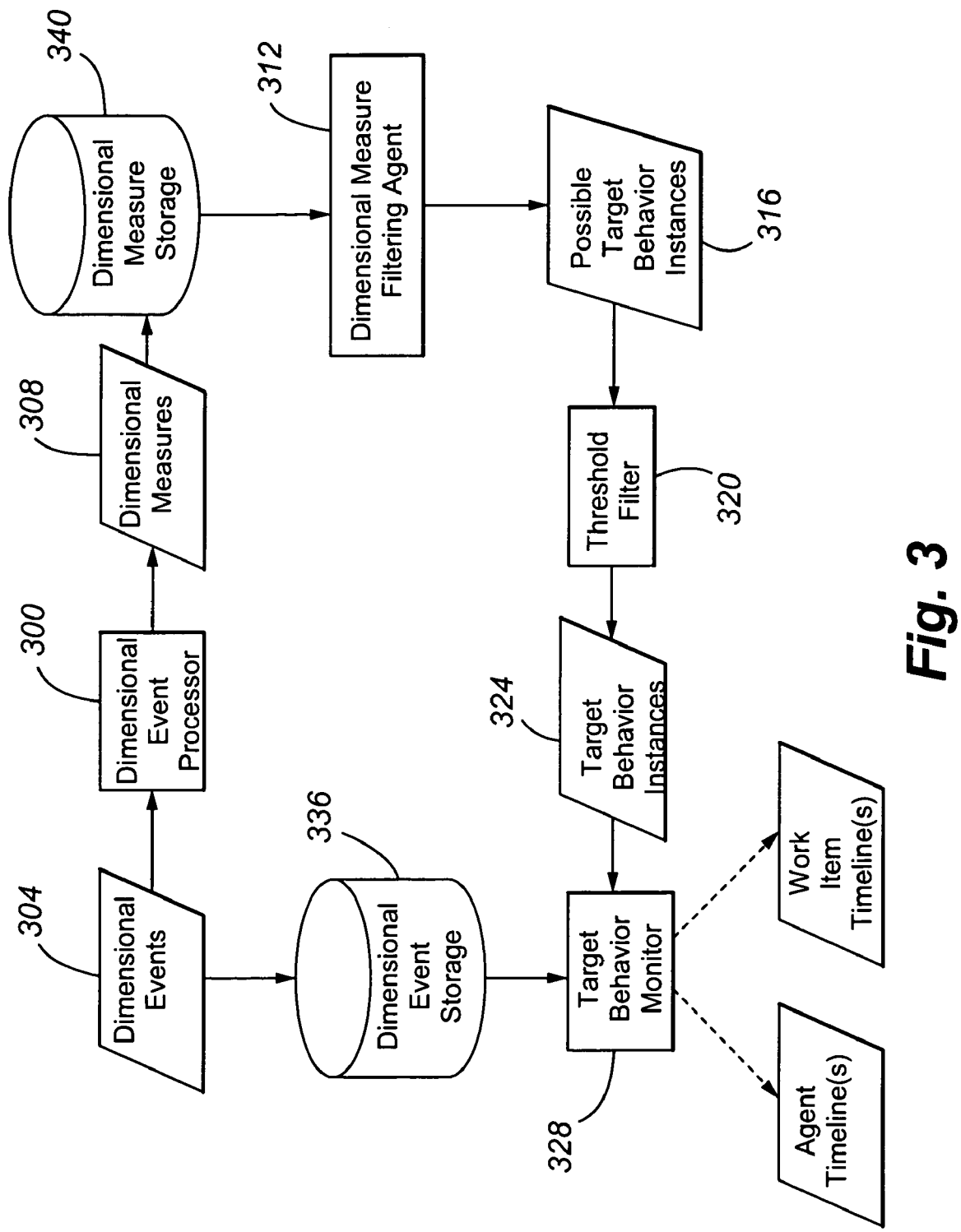
FIG. 3 is a block diagram depicting an embodiment of the target behavior identification module.

FIG. 3 depicts the target behavior identification module 232 according to an embodiment of the present invention. The module 232 includes an event processor 300 to convert events 304 into measures 308, a filtering agent 312 to compare measures 308 to various target behavior templates (or rule sets) to provide possible target behavior instances 316, and a threshold filter 320 to compare a total duration or an instance count of a selected type of target behavior to identify target behavior instances 324.

The module 232 preferably employs dimensional as opposed to relational modeling. As will be appreciated, dimensional modeling divides the world into measurements and context. Measurements are typically numeric and taken repeatedly. Numeric measurements are facts. Facts are surrounded by mostly textual context. Facts are very specific, well-defined numeric attributes and are collected in fact tables. The context surrounding facts is open-ended and verbose. Dimensions are selected groupings of context. Events are an occurrence or happening. Exemplary dimensions include work item (e.g., type, class, etc.), customer (e.g., identity, class, etc.), agent (e.g., identity, skills, etc.), routing (e.g., how work item was processed/routed, routing destination, etc.), class (e.g., inbound, outbound, internal, external, etc.), time (e.g., time stamp (date and time) of when an event occurred), state (e.g., state of agent, state of customer, state of work item, etc.), exit reason (e.g., reason for state change, etc.), and delivery method (e.g., direct, distributed, etc.) and/or an action involving one or more of the foregoing, such as arrival of a work item, agent state change, and the like. An event is typically associated with (structured) context. For example, events are typically associated with and/or are instances of the foregoing dimensions. A measure refers to a set of events having a defined relationship. Generally, an event is a point in time while a measure is a temporal duration or a count of event occurrences.

Examples of dimensions and measures are as follows: for problem behaviors one and two above, the dimensions are agent, agent state (active), date and time and the dimensional measure is the active time spent communicating; for problem behavior three above, the dimensions are agent, contact or agent state (alerting), date, and time and the dimensional measure is the altering time; for problem behavior four, the dimensions are agent, agent state (dialing), date and time and the dimensional measure is time spent dialing; for problem behavior five, the dimensions are agent, agent state (previewing), date and time and the dimensional measure is the time spent previewing the work item; for problem behavior six, the dimensions are agent, agent state (wrap-up), date, and time and the dimensional measure is the time spent wrapping up the contact; and so on.

The event processor 300 applies defined rules to group sets of dimensional events into dimensional measures. The operation of the processor 300 is a modified form of the event processing engine in CMS™ by Avaya Inc. The processor 300 is sensitive to the context associated with an event; thus, it can associate subsequent events of similar or related dimensionality.

The filtering agent 312 compares defined templates or rule sets against dimensional measures with a matching dimensional measure being considered to be an instance of a possible target behavior of a type defined by the matching template. The templates are user configurable. Templates commonly specify what dimensional measures are of interest and/or what the values (e.g., count and/or temporal duration) of the dimensional measures should be. Examples of templates are set forth above in problem behaviors 1-33. The reason that the matching dimensional event is considered to be a "possible" target behavior instance is that the dimensional event could have an innocent or acceptable explanation. The precise reason(s) for the occurrence of the matching dimensional event is typically investigated and determined only when a level of significance is associated with the matching behavior.

The threshold filter 320 determines whether or not a possible target behavior instance has a requisite level of significance warranting further investigation and determination by the target behavior monitor 328 (or contact center administrator/manager). This may be done either by comparing a total duration of all of the instances of a selected type of possible target behavior for a set of dimensions (e.g., over a selected time period interval) against a selected total duration threshold for that time interval or a count of the number of instances of a selected type of possible target behavior over a selected time interval against a selected count threshold for that time interval. When the selected threshold is exceeded, the possible target behavior instance is considered to be a target behavior instance warranting further investigation and determination by the target behavior monitor 328. When the selected threshold is not exceeded, the possible target behavior instance is not considered to be a target behavior instance warranting further investigation by the target behavior monitor 328.

As will be appreciated, differing types of target behavior can have differing thresholds. Some types of target behavior are considered generally to be more problematical or beneficial than others. Other types of target behavior are considered to more problematical or beneficial during particular time periods than others, e.g., during the busy hour, or with respect to particular types of work items than others, e.g., gold vs. bronze class. The differing levels of significance can be reflected by suitable adjustments to the thresholds. Thus, a first type of target behavior can have a first threshold under a first set of circumstances and a second different threshold under a second set of circumstances that differ from the first set.

As can be seen from FIG. 3, differing types of information are stored during operation of the module 232. The (raw) dimensional events 304 are stored in a first database 332. The dimensional measures 300 are stored in a second database 340.

When a type of target behavior is considered to be significant, the target behavior monitor 328 may drill down or across, using context such as agent, routing point, date/time, state, etc., to greater detail to determine a potential cause or reason for the type of target behavior. The detail, for example, may be agent timeline(s) (e.g., a series of agent state changes as a function of time) and work item timeline(s) (e.g., a series of work item state changes as a function of time) that include dimensional events stored in dimensional event storage 336.

Figure 10:
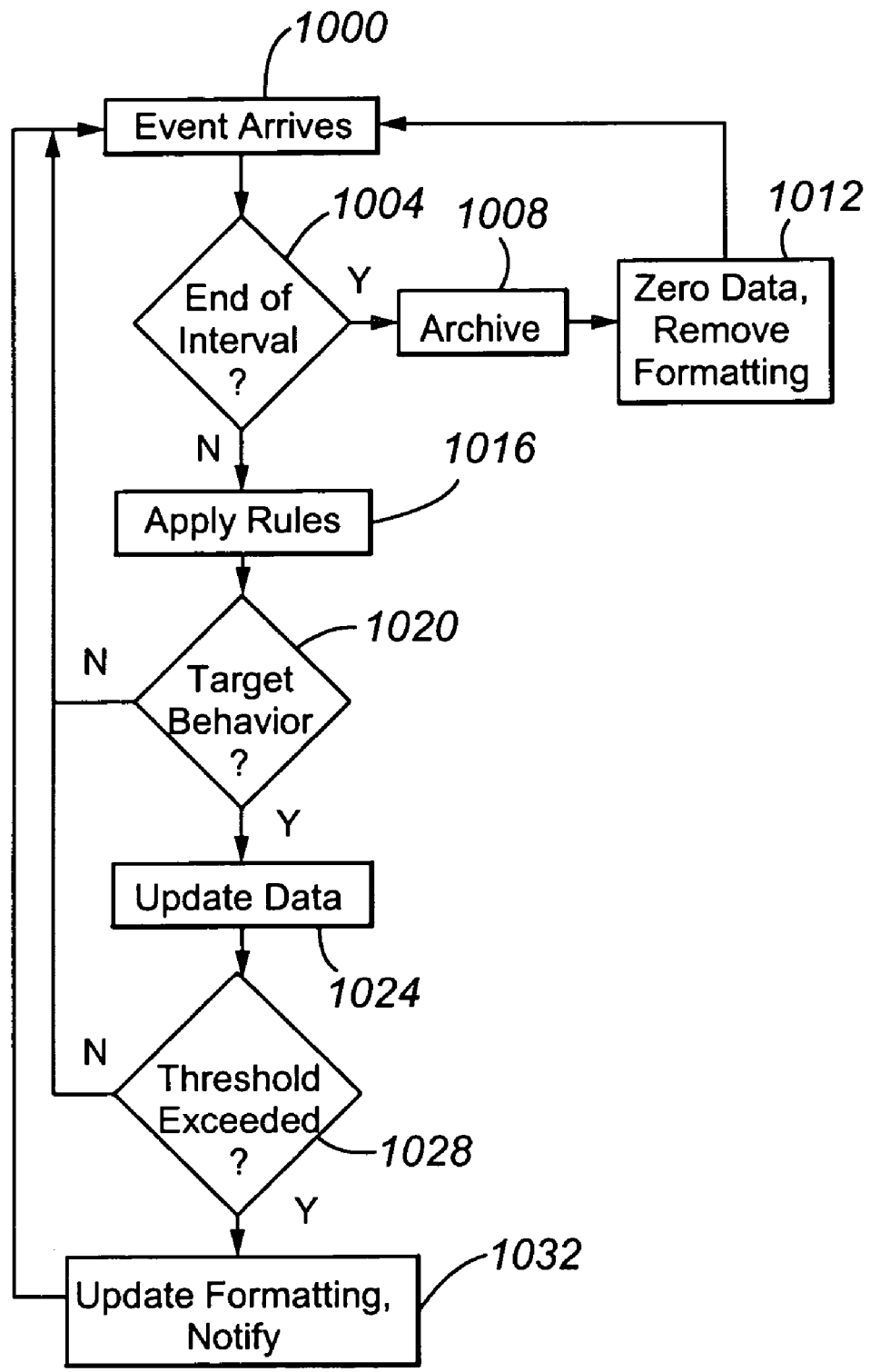
FIG. 10 is a flowchart depicting operation of the target behavior identification module.

The operation of the module 232 will now be discussed with reference to FIG. 10.

In box 1000, one or more dimensional events 304 arrives from the other components of the contact center, such as server 110, switch 130, and other servers 126.

In decision diamond 1004, the dimensional event processor 300 determines whether the end of the monitored time interval has arrived (i.e., whether the monitored time interval is over). If so, the processor 300, in step 1008, archives the received dimensional event(s), and, in step 1012, zeros out the various variables and awaits the arrival of a selected number of dimensional events in box 1000. If the interval is not over, the module 232 processes the events 304 into dimensional measures 308 and proceeds to step 1016.

In step 1016, the dimensional measure filtering agent 312 applies the rules or performs comparison matching against target behavior templates. When the selected dimensional measure 308 does not match a template, the module 232 awaits the arrival of the next dimensional event(s) in box 1000. When the selected dimensional measure 308 matches a template, an indicator is associated with the dimensional measure 308 data structures. The indicator typically identifies the type of target behavior corresponding to the matching template. The agent 312, in step 1024, updates the data structures accordingly.

In decision diamond 1028, the threshold filter 320 selects a threshold corresponding to the type of matching target behavior and determines whether the threshold is exceeded. As noted, the threshold may be either a count of the number of or a total duration identified instances of the target behavior over the selected time interval. If the threshold is not exceeded, the module 232 awaits the arrival of a selected number of dimensional events in box 1000. If the threshold is exceeded, the threshold filter 320, in step 1032, updates the formatting of data structures associated with the matching target behavior type and notifies the target behavior monitor 328. The formatting refers to the formatting of one or more fields in a notification or pertinent report. The formatting can be a font type or color or a color display for the field. For example, the field may show blank, yellow or red based on whether any one metric in the set of metrics associated with each light has exceeded a first or second threshold value. If any metric in the set exceeds the upper threshold for that metric, the light for the set displays red. If not and any metric exceeds the lower threshold, the light will be yellow. If not threshold is exceeded the light is blank.

The various reports used to track target behaviors will be discussed with reference to FIGS. 4-9 and 11.

Figure 4:
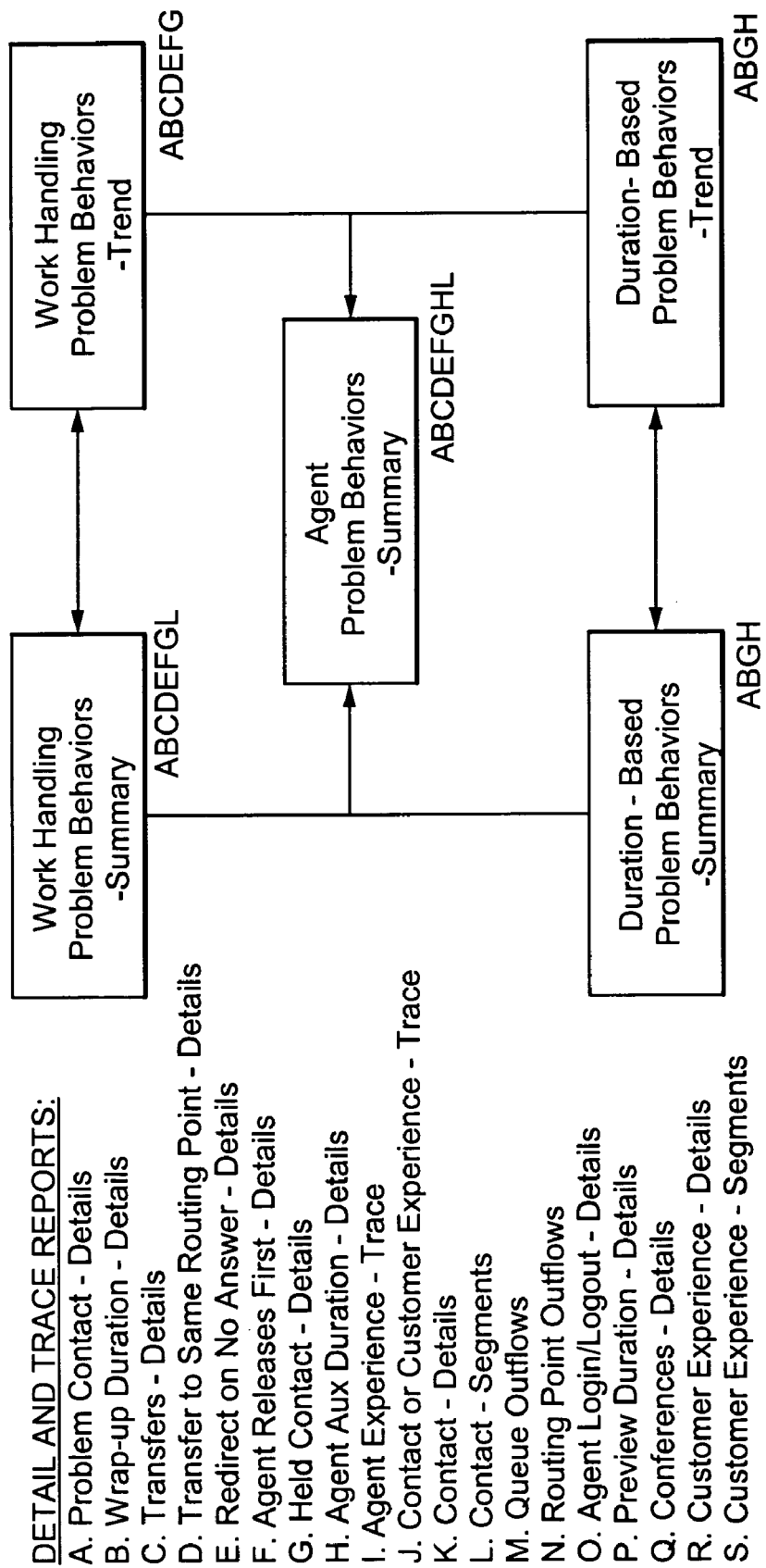
FIG. 4 is a block diagram of the relationships of various target behavior reports.

FIG. 4 shows various example reports and their relationships. As can be seen from FIG. 4, the work handling problem behaviors summary report (FIG. 5) and duration-based problem behaviors summary report (FIG. 6) are the higher level reports and correspond to target behaviors for the entire contact center. Both reports list all of the agents. More detailed reports are FIG. 7 (which shows historic trends (or counts) for a selected type of work handling problem behavior), FIG. 8 (which shows historic trends (or durations) for duration-based problem behaviors), and FIG. 9 (which shows a per-agent summary of the count or duration, as appropriate, of all types of problem behaviors).

Figure 5:
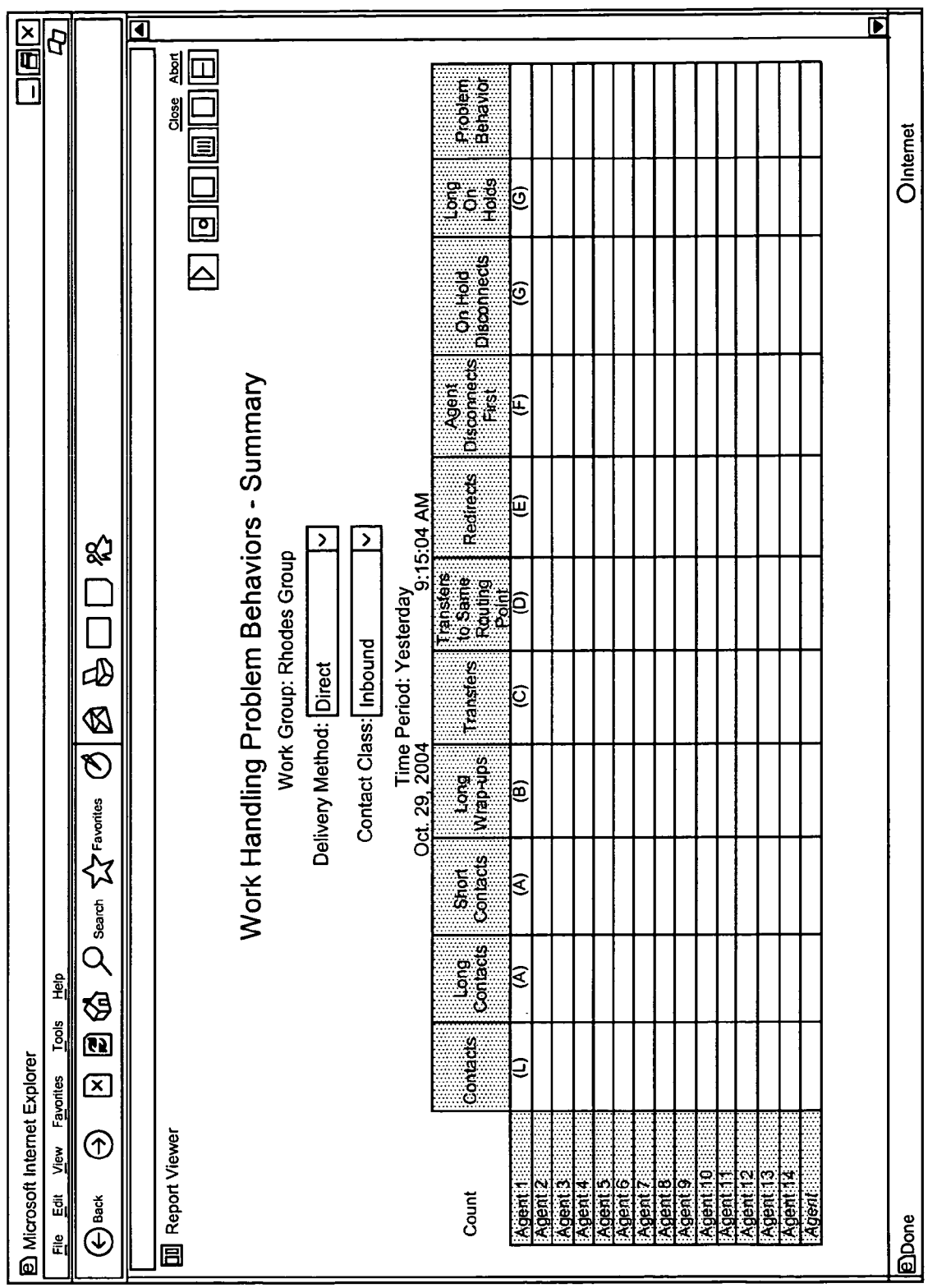
FIG. 5 depicts a work handling problem behaviors—summary report.

FIG. 5 tracks, for all of the agents, the counted problem behaviors, namely long contacts (item 1 above), short contacts (item 2 above), long wrap-ups (item 5 above), transfers (item 7 above), transfers to the same routing point (item 9 above), redirects (item 11 above), agent disconnects first (item 15 above), on-hold disconnects (item 16 above), and long on holds (item 17 above). In any problem behavior field, further, more detailed reports may be accessed by right clicking on the field corresponding to the selected agent and behavior type. For example, by right clicking on short contacts for agent 1 a further table known as problem contact—details (not shown) may be accessed. The row "Agent" totals each of the columns.

Figure 6:
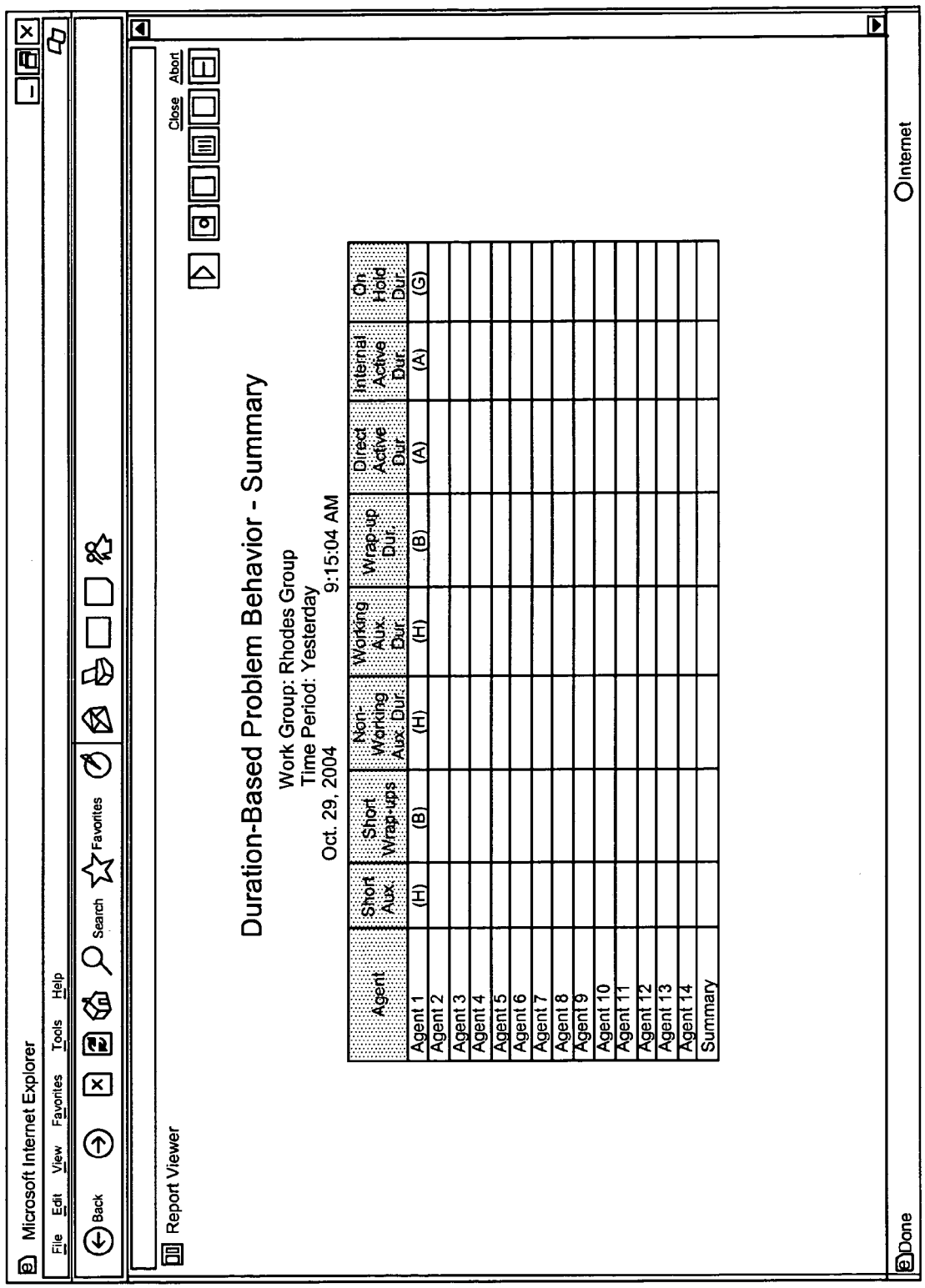
FIG. 6 depicts a duration-based problem behaviors—summary report.

FIG. 6 tracks, for all of the agents, the duration-based problem behaviors, namely the durations over a selected time interval of short aux (item 19 above), short wrap-ups (item 6 above), nonworking aux duration (item 22 above), working aux duration (item 21 above), wrap-up duration (item 23 above), direct active duration (item 24 above), internal active duration (item 25 above), and on hold duration (item 18 above). FIG. 5 further shows delivery method (e.g., direct vs. ACD delivered) and contact class (e.g., inbound, outbound, and internal). In any problem behavior field, further, more detailed reports may be accessed by right clicking on the field corresponding to the selected agent and behavior type. For example, by right clicking on short aux for agent 1 a further table known as agent aux duration—details (not shown) may be accessed. The row "Summary" totals each of the columns.

Figure 7:
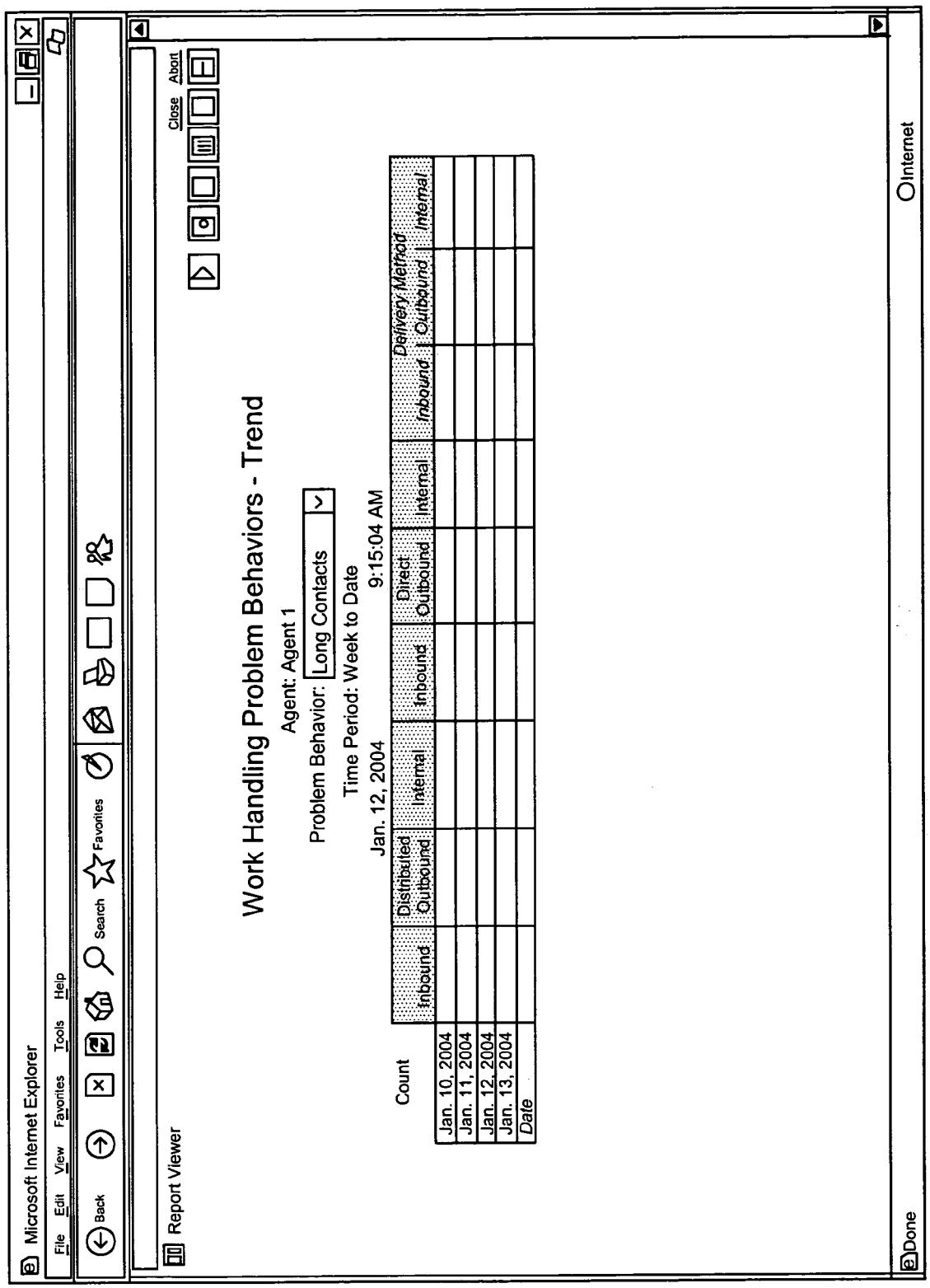
FIG. 7 depicts a work handling problem behaviors—trend report.

FIG. 7, which is accessible by left clicking on the field of FIG. 5 corresponding to the selected agent and type of work handling problem behavior, shows historic trends by delivery method (distributed and direct) and contact type (inbound, outbound, and internal). In each field, the count of the number of instances of the selected problem behavior (which is shown as long contacts) for the selected agent (which is shown as agent 1) over each selected time interval (in left column) is provided.

Figure 8:
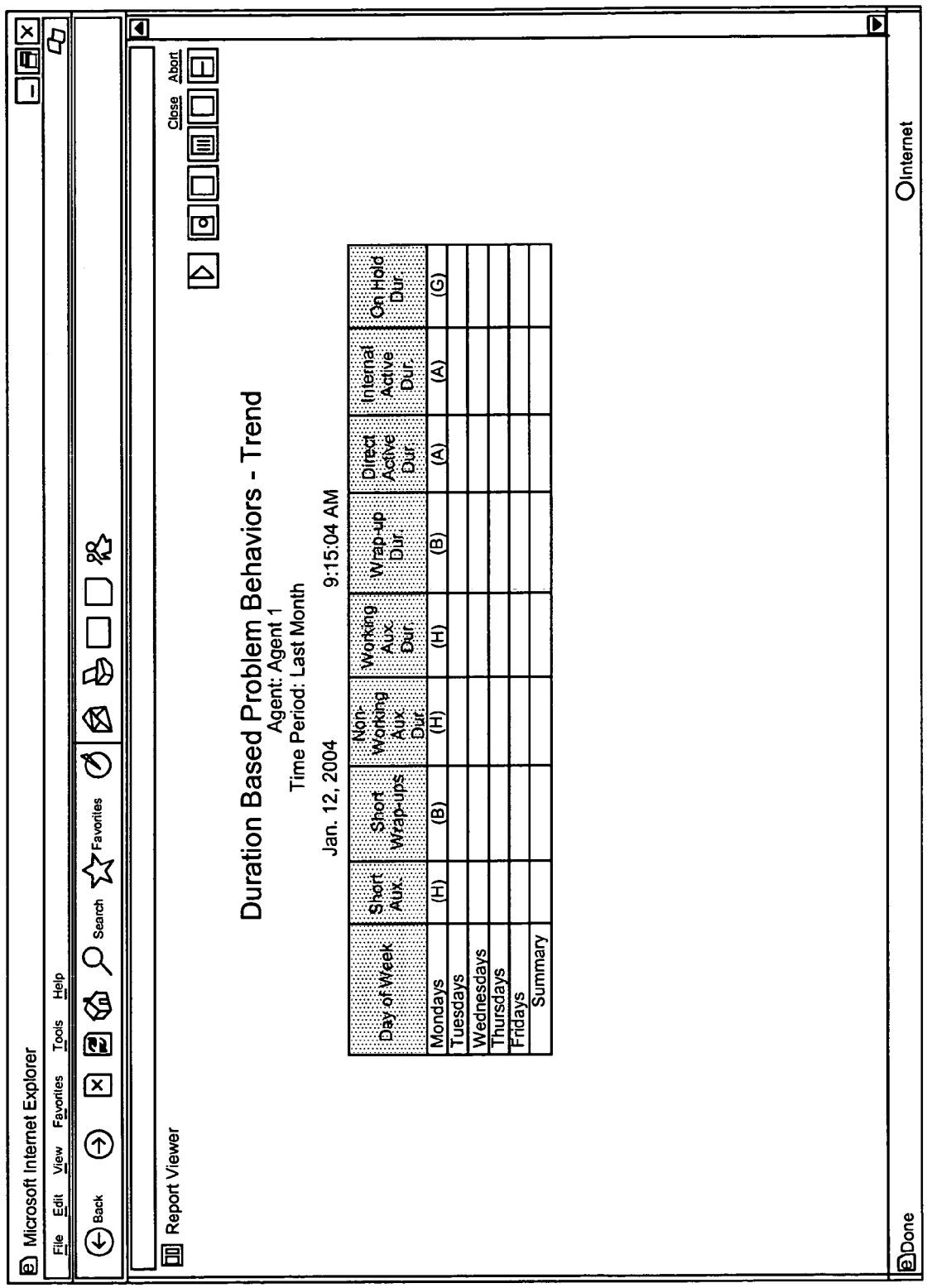
FIG. 8 is a duration-based problem behaviors—trend report.

FIG. 8, which is accessible by left clicking on the field of FIG. 6 corresponding to the selected agent and type of problem behavior, shows historic trends by for each type of duration-based problem behavior. In each field, the total duration of the instances of the listed problem behaviors for the selected agent (which is shown as agent 1) over each selected time interval (in left column) is provided. The row "Summary" totals each of the columns.

Figure 9:
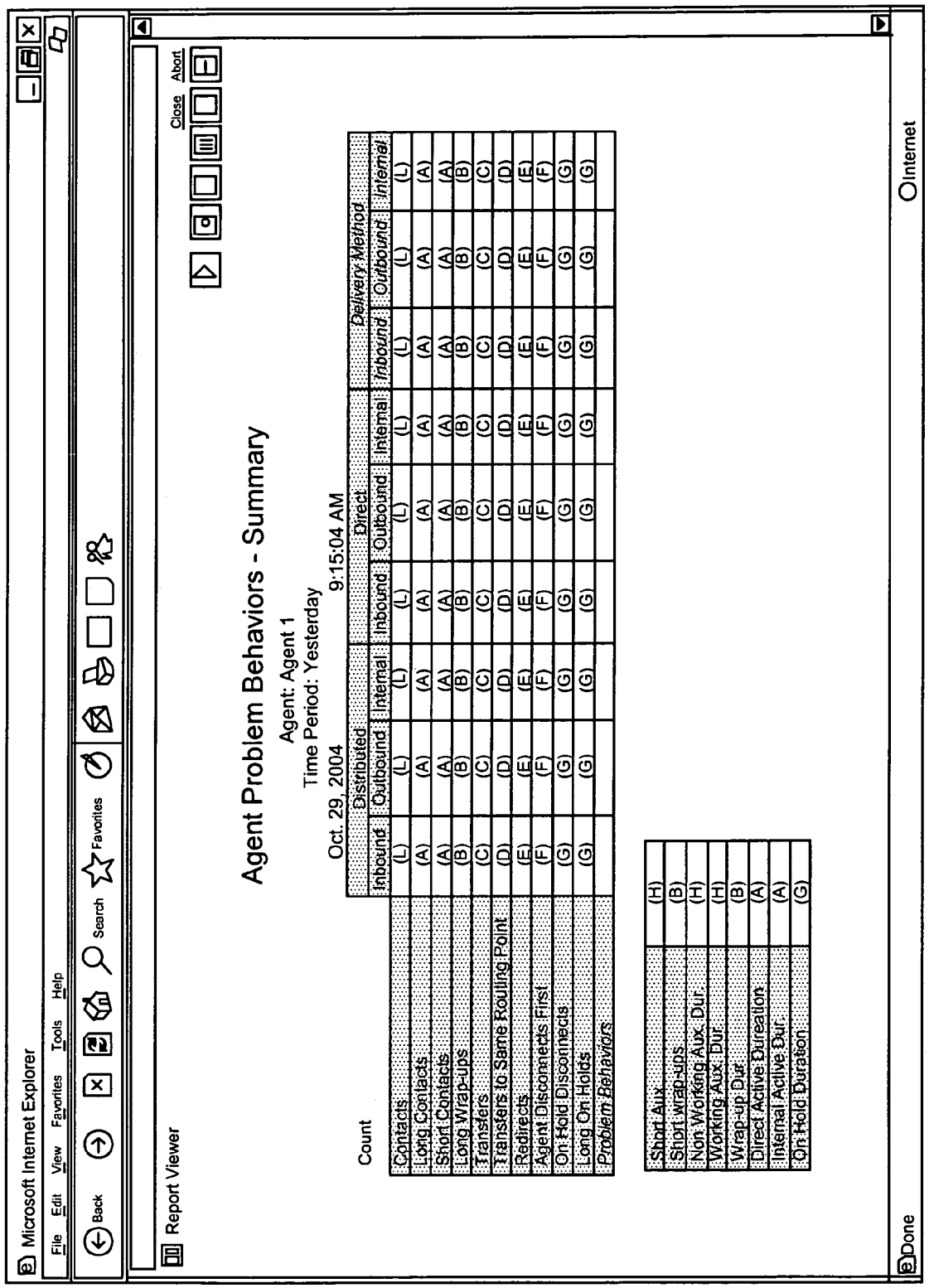
FIG. 9 is an agent problem behaviors—summary report.

FIG. 9, which is accessible by right clicking on the selected agent field of FIGS. 5-8 in the left column, shows a summary of all problem behaviors, whether significant or not, during the selected time interval for the selected agent. As noted above, right clicking on a selected field provides a more detailed table for the selected variables. For example, right clicking on the field corresponding to redirects and inbound provides a further table entitled "redirect on no answer—details" (not shown). The row "Problem Behaviors" totals each of the columns, and the "Inbound", "Outbound", and "Internal" columns under "Delivery Method" total the pertinent items in each row. For example, "Inbound" under "Delivery Method" is the sum of "Inbound" under "Distributed" and "Inbound" under "Direct".

Figure 11:
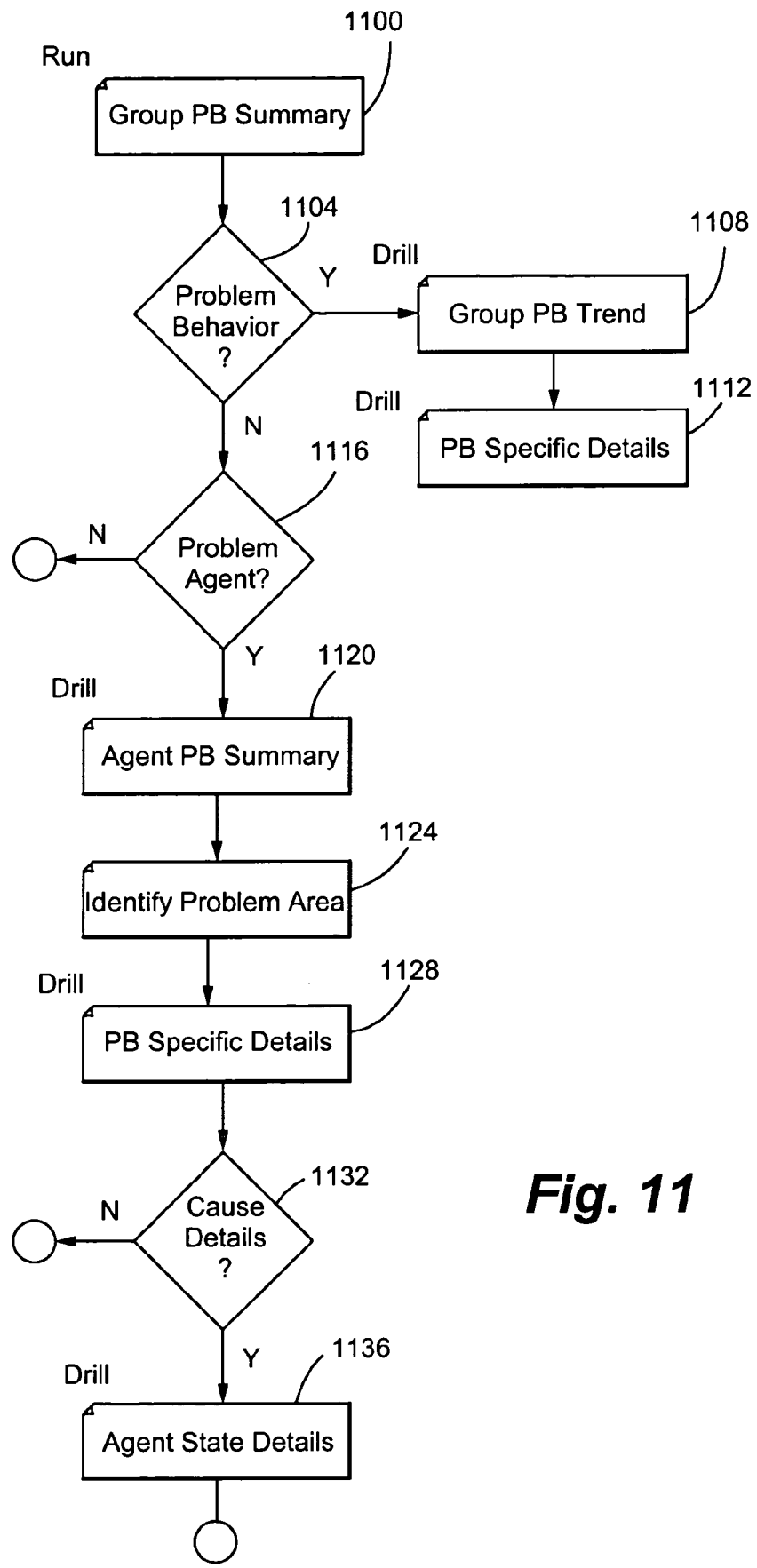
FIG. 11 is a flowchart depicting the use of the various reports to identify and analyze agent and group problem behaviors.

FIG. 11 shows the interrelationships of the various reports.

The monitor 328 starts out with a group problem behavior summary table (either the table of FIG. 5 or 6). In decision diamond 1104, the monitor 328 determines if there are any group (or agent-wide) problem behaviors identified as being significant. If so, the monitor 328 can view the group trend 1108 for the identified and selected significant problem behavior using either FIG. 7 or 8 and the group problem behavior specific details 1112 by right clicking on the selected field in either the group problem summary or trend reports. If there is no group problem behavior of interest, the monitor 328 in decision diamond 1116 determines if there is agent-specific problem behaviors identified as being significant. If so, the monitor 328 can view the selected agent's problem behaviors summary table (FIG. 9) and/or trend table (FIG. 7 or 8) (not shown). After identifying the problem area in step 1124, the monitor can drill down to specific details for the identified problem behavior by right clicking on the appropriate fields. In decision diamond 1132, the monitor determines if further details are required to ascertain the cause or reason of the problem behavior. If so, the monitor can drill down to an appropriate agent or contact state detail report 1136 to examine surrounding context (or other surrounding dimensional events). For example, if the selected problem behavior is short contact, short wrap-ups, transfers, transfers to same routing point or queue, redirects, cancels, agent releases first, or disconnects from hold, the monitor can examine the agent's state immediately after the short contact to determine if the agent went on break or left for the day immediately after the problem behavior occurred. In another example, if a short contact occurred, the monitor can examine the immediately preceding event to determine if it was a long contact. If the problem behavior is aux time, the monitor can look at immediately preceding events to determine if the agent logged in and immediately went into the aux state (e.g., to get coffee).

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

In another alternative embodiment, the module 232 prefilters events based on a set of rules followed by template matching. Prefiltering, for example, can group consecutive events or dimensions into related sets. For example, when a selected event is the dumping of a call a rule could require the next agent state to be associated with the event to determine if the call was dumped because the agent went on break or logged out. In a further example, when the selected event is a short or long call the rule could require the duration of the next work item to be associated with the event to determine whether the reason for a short or long call was a subsequent or preceding long or short call.

In other embodiments, the target behavior identification module 232 is implemented as depicted for target behaviors that are real-time in nature and/or as an application that queries a database and applies the rule sets to the data returned from the database filtered according to rules for behavior that are not real-time in nature (e.g., one might have different thresholds for an hour, day, week, month, etc., to identify a target behavior over different length time periods).

In another embodiment, information identifying target behaviors is stored in a separate data structure that combines disparate transactional data and rule sets into one structure for reporting and/or analysis of target behaviors.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a contact center comprising a plurality of agents for servicing contacts, a method comprising:
   processing, by a computer, a set of events involving at least one agent to yield a corresponding measure across a set of dimensions, wherein multiple events are included in the set of events, and wherein multiple dimensions are included in the set of dimensions;
   comparing, by the computer, the measure to at least one rule set, the at least one rule set corresponding to a type of target behavior of an agent;
   determining, by the computer, that the measure is defined by the at least one rule set;
   in response to the determining step, associating, by the computer, the type of target agent behavior corresponding to the at least one rule set with the at least one agent, and wherein each rule set describes a plurality of dimensions;
   threshold filtering, wherein the measure is compared to threshold values for the dimensions in the set of dimensions, wherein the measure is compared to a plurality of threshold values for at least one of the dimensions in the set of dimensions, wherein in response to at least first threshold values being exceeded in a first set of circumstances the type of target agent behavior corresponding to the at least one rule set is reported, wherein in response to said first threshold values but not second threshold values being exceeded in a second set of circumstances the type of target behavior corresponding to the at least one rule set is not reported, and wherein in response to said first and second threshold values being exceeded in said second set of circumstances the type of target behavior corresponding to the at least one rule set is reported.

2. The method of claim 1, wherein the at least one rule set is a plurality of rule sets and wherein each of the plurality of rule sets corresponds to a different type of target behavior.

3. The method of claim 2, wherein each event in the set of events temporally occurred consecutively and comprising:
   determining, by the computer, a reason for the target behavior based on the plurality of causally related events.

4. The method of claim 3, wherein the set of events include a first event preceding the target behavior and a second event following the target behavior.

5. The method of claim 1, wherein the at least one rule set is a plurality of rule sets, wherein each of the plurality of rule sets corresponds to a different type of target behavior, wherein a plurality of event sets are defined by a plurality of target behavior types and further comprising:

summing, by the computer and over a selected set of dimensions, the instances of each type of target behavior for each agent and for a grouping of agents.

6. The method of claim 4, wherein the instances are summed across all types of target behavior.

7. The method of claim 1, wherein the at least one rule set is a plurality of rules sets, wherein each of the plurality of rule sets corresponds to a different type of target behavior, wherein a plurality of event sets are defined by a plurality of target behavior types and further comprising:

displaying, by the computer, to a user a first display comprising, for each of the plurality of agents, a number of instances of each of the plurality of target behavior types;

receiving, from the user, a selection of a first field in the first display, the first field corresponding to a first type of target behavior; and in response thereto, displaying, by the computer, to the user a second display comprising, for at least one of a selected agent and a grouping of agents, a number of historic instances of the first type of target behavior over prior time intervals.

8. The method of claim 1, wherein the at least one rule set is a plurality of rule sets, wherein each of the plurality of rule sets corresponds to a different type of target behavior, wherein a plurality of event sets are defined by a plurality of target behavior types and further comprising:

displaying, by the computer, to a user a first display comprising, for each of the plurality of agents, a number of instances of each of the plurality of target behavior types;

receiving, from the user, a selection of a first field in the first display, the first field corresponding to a first agent; and in response thereto, displaying, by the computer, to the user a second display comprising, for the selected agent, a number of instances of each of the plurality of target behavior types occurring during a selected time interval.

9. The method of claim 1, wherein the at least one rule set is a plurality of rule sets, wherein each of the plurality of rule sets corresponds to a different type of target behavior, and further comprising:

selecting, by the computer, the threshold values associated with the type of target behavior corresponding to the selected rule set;

determining, by the computer, whether at least one of a number of instances and total of durations of the number of instances has a first or a second type of relationship to the threshold;

when the first relationship exists, deeming, by the computer, the type of target behavior corresponding to the selected rule set to have occurred during a selected time interval; and when the second relationship exists, not deeming, by the computer, the type of target behavior corresponding to the selected rule set to have occurred during the selected time interval.

10. The method of claim 1, wherein the at least one rule set is a plurality of sets, wherein each of the plurality of rule sets corresponds to a different type of target behavior, wherein the plurality of rule sets is at least twelve rule sets and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, repeated conference with a selected person, repeated transfer to a selected person, and variation in wrap up time.

11. In a contact center comprising a plurality of agents for servicing contacts, a method comprising:

processing, by a computer, a set of events involving at least one agent to yield a corresponding measure across a set of dimensions;

comparing, by a computer, the measure to a plurality of rule sets, each of the rule sets corresponding to a different type of target agent behavior;

determining that the measure is defined by a selected rule set; and in response to the determining step:

determining, by the computer, whether a first set of threshold values for the selected rule set is exceeded by the measure in a first set of circumstances, wherein the type of target agent behavior corresponding to the selected rule set is associated with the at least one agent;

determining, by the computer, whether a second set of threshold values for the selected rule is exceeded by the measure in a second set of circumstances, wherein the type of target behavior corresponding to the selected rule set is associated with the at least one agent; and wherein the type of target behavior corresponding to the selected rule set is not associated with the at least one agent when at least one of the first set of threshold values is not exceeded in the second set of circumstances or when the second set of threshold values is not exceeded in the first set of circumstances.

12. The method of claim 11, wherein the set of events comprises a plurality of causally related events occurring at different times, wherein each rule set describes a plurality of dimensions, wherein each event in the set of events temporally occurred consecutively and further comprising:

determining, by a computer, a reason for the target behavior based on the plurality of causally related events.

13. The method of claim 11, wherein a plurality of event sets are defined by a plurality of target behavior types and further comprising:

summing, by a computer, over a selected set of dimensions, the instances of each type of target behavior for each agent and for a grouping of agents.

14. The method of claim 11, wherein a plurality of event sets are defined by a plurality of target behavior types and further comprising:

displaying, by a computer, to a user a first display comprising, for each of the plurality of agents, a number of instances of each of the plurality of target behavior types;

receiving, from the user, a selection of a first field in the first display, the first field corresponding to a first type of target behavior; and in response thereto, displaying, by a computer, to the user a second display comprising, for at least one of a selected agent and a grouping of agents, a number of historic instances of the first type of target behavior over prior time intervals.

15. The method of claim 11, wherein a plurality of event sets are defined by a plurality of target behavior types and further comprising:

displaying, by a computer, to a user a first display comprising, for each of the plurality of agents, a number of instances of each of the plurality of target behavior types;

receiving, from the user, a selection of a first field in the first display, the first field corresponding to a first agent; and in response thereto, displaying, by a computer, to the user a second display comprising, for the selected agent, a number of instances of each of the plurality of target behavior types occurring during a selected time interval.

16. The method of claim 11, further comprising:

selecting, by a computer, a threshold associated with the type of target behavior corresponding to the selected rule set;

determining, by a computer, whether at least one of a number of instances and total of durations of the number of instances has a first or a second type of relationship to the threshold;

when the first relationship exists, deeming, by a computer, the type of target behavior corresponding to the selected rule set to have occurred during a selected time interval; and when the second relationship exists, not deeming, by a computer, the type of target behavior corresponding to the selected rule set to have occurred during the selected time interval.

17. The method of claim 11, wherein the plurality of rule sets is at least twelve rule sets and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, and variation in wrap up time.

18. A contact center comprising:

a plurality of agents for servicing incoming contacts: and a target behavior identification module operable to process a set of events involving at least one agent to yield a corresponding measure across a set of dimensions; compare the measure to a plurality of rule sets, each of the rule sets corresponding to a different type of target agent behavior; and when the measure is defined by a selected rule set and a first set of thresholds is exceeded in a first set of circumstances, associate a type of target agent behavior corresponding to the selected rule set with the at least one agent;

wherein the measure is defined by the selected rule set and a second set of thresholds is exceeded in a second set of circumstances, associated the type of target behavior corresponding to the selected rule set with the at least one agent;

where the measure is defined by the selected rule set and the first set of thresholds is not exceeded in the first set of circumstances the type of behavior corresponding to the selected rule set is not associated with the at least one agent; and where the measure is defined by the selected rule set and the second set of thresholds is not exceeded in the second set of circumstances the type of behavior corresponding to the selected rule set is not associated with the at least one agent.

19. The contact center of claim 18, wherein the set of events comprises a plurality of causally related events occurring at different times, wherein each rule set describes a plurality of dimensions, and wherein each event in the set of events temporally occurred consecutively and wherein the target behavior identification module is further operable to determine a reason for the target behavior based on the plurality of causally related events.

20. The contact center of claim 18, wherein a plurality of event sets are defined by a plurality of target behavior types, wherein the target behavior identification module is further operable to sum, over a selected time interval, the instances of each type of target behavior for each agent and for a grouping of agents and wherein the target behavior identification module is further operable to display to a user a first display comprising, for each of the plurality of agents, a number of instances of each of the plurality of target behavior types and the sums; receive, from the user, a selection of a first field in the first display, the first field corresponding to a first type of target behavior; and in response thereto, display to the user a second display comprising, for at least one of a selected agent and a grouping of agents, a number of historic instances of the first type of target behavior over prior time intervals.

21. The contact center of claim 18, wherein a plurality of event sets are defined by a plurality of target behavior types and wherein the target behavior identification module is further operable to display to a user a first display comprising, for each of the plurality of agents, a number of instances of each of the plurality of target behavior types; receive, from the user, a selection of a first field in the first display, the first field corresponding to a first agent; in response thereto, display to the user a second display comprising, for the selected agent, a number of instances of each of the plurality of target behavior types occurring during a selected time interval; receive from the user a selection of a second field in the second display, the second field corresponding to a type of target behavior; and, in response to the selection of the second field, display to the user a third display comprising additional details associated with the instances of the selected type of target behavior, wherein the number of instances of each of the plurality of target behavior types are divided into at least one of contact type and distribution method.

22. The contact center of claim 18, wherein the target behavior identification module is further operable to select a threshold associated with the type of target behavior corresponding to the selected rule set; determine whether at least one of a number of instances and total of durations of the number of instances has a first or a second type of relationship to the threshold; when the first relationship exists, deem the type of target behavior corresponding to the selected rule set deemed to have occurred during a selected time interval; and when the second relationship exists, not deem the type of target behavior corresponding to the selected rule set to have occurred during the selected time interval.

23. The contact center of claim 18, wherein the plurality of rule sets is at least twelve rule sets and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, and variation in wrap up time.

24. In a contact center comprising a plurality of agents for servicing contacts, a method comprising:
processing, by a computer, a set of events to yield a corresponding measure across a set of dimensions;
comparing, by the computer, the measure to at least one rule set, the at least one rule set corresponding to a type of target behavior;
when the measure is defined by the at least one rule set, associating, by the computer, the measure with the type of target behavior corresponding to the at least one rule set, wherein the set of events comprises a plurality of causally related events occurring at different times,
wherein each rule set describes a plurality of dimensions, wherein the at least one rule set is a plurality of rule sets, wherein each of the plurality of rule sets corresponds to a different type of target behavior, and wherein a plurality of event sets are defined by a plurality of target behavior types;
displaying, by the computer, to a user a first display comprising, for each of the plurality of agents, a number of instances of each of the plurality of target behavior types;
receiving, from the user, a selection of a first field in the first display, the first field corresponding to a first type of target behavior; and
in response thereto, displaying, by the computer, to the user a second display comprising, for at least one of a selected agent and a grouping of agents, a number of historic instances of the first type of target behavior over prior time intervals.

25. In a contact center comprising a plurality of agents for servicing contacts, a method comprising:
processing, by a computer, a set of events to yield a corresponding measure across a set of dimensions;
comparing, by the computer, the measure to at least one rule set, the at least one rule set corresponding to a type of target behavior;
when the measure is defined by the at least one rule set, associating, by the computer, the measure with the type of target behavior corresponding to the at least one rule set, wherein the set of events comprises a plurality of causally related events occurring at different times, wherein each rule set describes a plurality of dimensions, wherein the at least one rule set is a plurality of rule sets, wherein each of the plurality of rule sets corresponds to a different type of target behavior, and wherein a plurality of event sets are defined by a plurality of target behavior types;
displaying, by the computer, to a user a first display comprising, for each of the plurality of agents, a number of instances of each of the plurality of target behavior types;
receiving, from the user, a selection of a first field in the first display, the first field corresponding to a first agent; and
in response thereto, displaying, by the computer, to the user a second display comprising, for the selected agent, a number of instances of each of the plurality of target behavior types occurring during a selected time interval.

26. The method of claim 25, further comprising:
receiving from the user a selection of a second field in the second display, the second field corresponding to a type of target behavior; and
in response thereto, displaying, by the computer, to the user a third display comprising additional details associated with the instances of the selected type of target behavior.

27. The method of claim 25, wherein the number of instances of each of the plurality of target behavior types are divided into at least one of contact type and distribution method.

28. In a contact center comprising a plurality of agents for servicing contacts, a method comprising:
processing, by a computer, a set of events to yield a corresponding measure across a set of dimensions;
comparing, by the computer, the measure to at least one rule set, the at least one rule set corresponding to a type of target behavior;
when the measure is defined by the at least one rule set, associating, by the computer, the measure with the type of target behavior corresponding to the at least one rule set, wherein the set of events comprises a plurality of causally related events occurring at different times, wherein each rule set describes a plurality of dimensions, wherein the at least one rule set is a plurality of rule sets, wherein each of the plurality of rule sets corresponds to a different type of target behavior, wherein the plurality of rule sets is at least twelve rule sets, and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, repeated conference with a selected person, repeated transfer to a selected person, and variation in wrap up time.

29. In a contact center comprising a plurality of agents for servicing contacts, a method comprising:
processing, by a computer, a set of events to yield a corresponding measure across a set of dimensions;
comparing, by a computer, the measure to a plurality of rule sets, each of the rule sets corresponding to a different type of target behavior;
when the measure is defined by the a selected rule set, associating, by a computer, the measure with a type of target behavior corresponding to the selected rule set, wherein a plurality of event sets are defined by a plurality of target behavior types;
displaying, by a computer, to a user a first display comprising, for each of the plurality of agents, a number of instances of each of the plurality of target behavior types;
receiving, from the user, a selection of a first field in the first display, the first field corresponding to a first type of target behavior; and
in response thereto, displaying, by a computer, to the user a second display comprising, for at least one of a selected agent and a grouping of agents, a number of historic instances of the first type of target behavior over prior time intervals.

30. In a contact center comprising a plurality of agents for servicing contacts, a method comprising:

processing, by a computer, a set of events to yield a corresponding measure across a set of dimensions;

comparing, by a computer, the measure to a plurality of rule sets, each of the rule sets corresponding to a different type of target behavior;

when the measure is defined by the a selected rule set, associating, by a computer, the measure with a type of target behavior corresponding to the selected rule set, wherein a plurality of event sets are defined by a plurality of target behavior types;

displaying, by a computer, to a user a first display comprising, for each of the plurality of agents, a number of instances of each of the plurality of target behavior types;

receiving, from the user, a selection of a first field in the first display, the first field corresponding to a first agent; and in response thereto, displaying, by a computer, to the user a second display comprising, for the selected agent, a number of instances of each of the plurality of target behavior types occurring during a selected time interval.

31. The method of claim 30, further comprising:

receiving from the user a selection of a second field in the second display, the second field corresponding to a type of target behavior; and in response thereto, displaying, by a computer, to the user a third display comprising additional details associated with the instances of the selected type of target behavior.

32. The method of claim 30, wherein the number of instances of each of the plurality of target behavior types are divided into at least one of contact type and distribution method.

33. In a contact center comprising a plurality of agents for servicing contacts, a method comprising:

processing, by a computer, a set of events to yield a corresponding measure across a set of dimensions;

comparing, by a computer, the measure to a plurality of rule sets, each of the rule sets corresponding to a different type of target behavior;

when the measure is defined by the a selected rule set, associating, by a computer, the measure with a type of target behavior corresponding to the selected rule set, wherein the plurality of rule sets is at least twelve rule sets and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, and variation in wrap up time.

34. A contact center comprising:

a plurality of agents for servicing incoming contacts: and a target behavior identification module operable to process a set of events to yield a corresponding measure across a set of dimensions; compare the measure to a plurality of rule sets, each of the rule sets corresponding to a different type of target behavior; and, when the measure is defined by the a selected rule set, associate the measure with a type of target behavior corresponding to the selected rule set, wherein a plurality of event sets are defined by a plurality of target behavior types, wherein the target behavior identification module is further operable to sum, over a selected time interval, the instances of each type of target behavior for each agent and for a grouping of agents and wherein the target behavior identification module is further operable to display to a user a first display comprising, for each of the plurality of agents, a number of instances of each of the plurality of target behavior types and the sums; receive, from the user, a selection of a first field in the first display, the first field corresponding to a first type of target behavior; and in response thereto, display to the user a second display comprising, for at least one of a selected agent and a grouping of agents, a number of historic instances of the first type of target behavior over prior time intervals.

35. A contact center comprising:

a plurality of agents for servicing incoming contacts: and a target behavior identification module operable to process a set of events to yield a corresponding measure across a set of dimensions; compare the measure to a plurality of rule sets, each of the rule sets corresponding to a different type of target behavior; and, when the measure is defined by the a selected rule set, associate the measure with a type of target behavior corresponding to the selected rule set, wherein a plurality of event sets are defined by a plurality of target behavior types and wherein the target behavior identification module is further operable to display to a user a first display comprising, for each of the plurality of agents, a number of instances of each of the plurality of target behavior types; receive, from the user, a selection of a first field in the first display, the first field corresponding to a first agent; in response thereto, display to the user a second display comprising, for the selected agent, a number of instances of each of the plurality of target behavior types occurring during a selected time interval; receive from the user a selection of a second field in the second display, the second field corresponding to a type of target behavior; and, in response to the selection of the second field, display to the user a third display comprising additional details associated with the instances of the selected type of target behavior, wherein the number of instances of each of the plurality of target behavior types are divided into at least one of contact type and distribution method.

36. A contact center comprising:

a plurality of agents for servicing incoming contacts: and a target behavior identification module operable to process a set of events to yield a corresponding measure across a set of dimensions; compare the measure to a plurality of rule sets, each of the rule sets corresponding to a different type of target behavior; and, when the measure is defined by the a selected rule set, associate the measure with a type of target behavior corresponding to the selected rule set, wherein the plurality of rule sets is at least twelve rule sets and wherein the target behaviors corresponding to the plurality of rule sets comprise a plurality of the following: long contact, short contact, long alert, long initiate, long preview, long wrap up, short wrap up, transfer from, transfer in, blind transfer, transfer to a same routing point, transfer to a same queue, conference, redirect from agent rejection, redirect from time out, cancel from agent rejection, cancel from time out, agent release first, disconnect from hold, long hold, hold time, short aux, aux time, aux working time, aux non-working time, wrap up time, direct time, internal time, short contact-then-aux, short contact-then-logout, login-then-aux, short and long contacts side-by-side, variation in active time, and variation in wrap up time.

* * * * *